(12) United States Patent
Singh

(10) Patent No.: US 11,568,864 B2
(45) Date of Patent: Jan. 31, 2023

(54) PROCESSING SPEECH SIGNALS OF A USER TO GENERATE A VISUAL REPRESENTATION OF THE USER

(71) Applicant: Carnegie Mellon University, Pittsburgh, PA (US)

(72) Inventor: Rita Singh, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 256 days.

(21) Appl. No.: 16/539,701

(22) Filed: Aug. 13, 2019

(65) Prior Publication Data

US 2020/0051565 A1 Feb. 13, 2020

Related U.S. Application Data

(60) Provisional application No. 62/918,264, filed on Jan. 23, 2019, provisional application No. 62/764,636, filed on Aug. 13, 2018.

(51) Int. Cl.
*G10L 15/22* (2006.01)
*G06T 11/60* (2006.01)
(Continued)

(52) U.S. Cl.
CPC .............. *G10L 15/22* (2013.01); *G06T 11/60* (2013.01); *G10L 13/00* (2013.01); *G10L 15/02* (2013.01); *G10L 15/26* (2013.01)

(58) Field of Classification Search
CPC ......... G06T 11/60; G10L 15/02; G10L 15/22; G10L 13/00; G10L 13/043; G10L 15/26;
(Continued)

(56) References Cited

U.S. PATENT DOCUMENTS 6,735,566 B1 * 5/2004 Brand .................. G06K 9/6297
345/473
7,168,953 B1 * 1/2007 Poggio .................... G06T 13/40
704/E21.02
(Continued)

OTHER PUBLICATIONS

H. Hermansky and N. Morgan, "RASTA processing of speech," in IEEE Transactions on Speech and Audio Processing, vol. 2, No. 4, pp. 578-589, Oct. 1994, doi: 10.1109/89.326616. (Year: 1994).*

*Primary Examiner* — Angela A Armstrong
(74) *Attorney, Agent, or Firm* — Fish & Richardson P.C.

(57) ABSTRACT

A computing system for generating image data representing a speaker's face includes a detection device configured to route data representing a voice signal to one or more processors and a data processing device comprising the one or more processors configured to generate a representation of a speaker that generated the voice signal in response to receiving the voice signal. The data processing device executes a voice embedding function to generate a feature vector from the voice signal representing one or more signal features of the voice signal, maps a signal feature of the feature vector to a visual feature of the speaker by a modality transfer function specifying a relationship between the visual feature of the speaker and the signal feature of the feature vector; and generates a visual representation of at least a portion of the speaker based on the mapping, the visual representation comprising the visual feature.

20 Claims, 24 Drawing Sheets

(51) Int. Cl.
*G10L 15/02* (2006.01)
*G10L 13/00* (2006.01)
*G10L 15/26* (2006.01)

(58) Field of Classification Search
CPC . G10L 15/265; G10L 2021/105; G10L 21/01; G10L 21/10
See application file for complete search history.

(56) References Cited

U.S. PATENT DOCUMENTS

| | | | |
|---|---|---|---|
| 2011/0227931 A1* | 9/2011 | Lu | G06T 13/205 345/473 |
| 2019/0130628 A1* | 5/2019 | Cao | H04R 27/00 |
| 2020/0043465 A1* | 2/2020 | Yang | H04N 21/235 |

* cited by examiner

овAMING SPEECH SIGNALS OF A USER
PROCESSING SPEECH SIGNALS OF A USER TO GENERATE A VISUAL REPRESENTATION OF THE USER

CLAIM OF PRIORITY

This application claims priority under 35 U.S.C. § 119(e) to U.S. Provisional Application Ser. No. 62/764,636, filed on Aug. 13, 2018, and U.S. Provisional Application Ser. No. 62/918,264, filed on Jan. 23, 2019, and the entire contents of each of which are hereby incorporated by reference.

TECHNICAL FIELD

This document relates to data processing of audio data representing voice signals and image data representing physical likenesses of users. More specifically, this disclosure relates to generating a visual representation of a user's appearance using features of the voice signal of the user, and conversely, generating a simulated voice signal based on image data representing the appearance of the user.

BACKGROUND

Current biometric systems based on voice perform speaker identification and verification/authentication using speaker matching techniques that compare templates of pre-recorded voices to voice recordings whose speakers must be identified or authenticated. In some applications, limited predictions of a speaker's mental and physical health status, and emotional states can be made from voice. These systems are not configured to derive information from voice that is necessary and sufficient to recreate visual imagery of an accurate physical embodiment and visage of the speaker, or an accurate physical likeness of the speaker, either as a two-dimensional image or as a three-dimensional spatial image. For example, these systems are not configured to recreate an accurate image of the speaker's facial features from voice signals.

SUMMARY

This document describes an end-to-end process and system for reconstructing a physically accurate avatar (embodiment and visage) of humans from their voices. The system is configured to visually recreate a speaker's persona for many different purposes.

The human voice is a complex signal that correlates to different degrees with various physical-structural parameters of the speaker. Humans also implicitly acknowledge that there is a relation between voice and body structure. A speaker can be visualized by a person based on the physical characteristics their voices imply. In some cases, humans can guess a person's height, gender, age etc. from their voice. The relation need not be directly made; indirect inferences are also often made. For example, one set of studies have shown that people are able to put faces to voices, while others show that people are able to guess body size etc. from a face. In effect, even humans are often able to formulate a non-random guess of a person's physical structure from their voice, implicitly following the statistical rationale of interlinked inferences.

There are direct and indirect relationships of voice to persona. The human voice is directly influenced by many factors such as the facial structure of the speaker, the structure of their vocal tract, lung capacity, tissue elasticity, muscle control, and a variety of other features, many of which are uncatalogued and even unknown. These factors in turn have statistical relationships with other physical parameters of the speaker, thus providing both direct and indirect linkages between the speaker's voice and these parameters. For example, studies relate voice to body size, relate voice to gender, relate voice to the shape of vocal tract, relate voice to age, relate voice to weight, relate voice to height, relate voice to race, and relate voice to general indicators of physiology. On the other hand, studies in forensic anthropology have related gender and stature to each other, and differences in both in turn to different populations. Race has been correlated with skeletal structure, and skeletal structure has been linked to external body appearance. In fact, the list of indirect relations that can be formed between voice and various body parameters through the interlinking of such studies is enormous, and we only list some very limited examples above.

There are genetic and epigenetic relationships between voice and persona. In the medical literature and other study contexts (such as developmental psychology), positive correlations have been found between different body parameters and voice. The structure of vocal tract (size and shape of larynx, neck, throat etc.) is determined, among other factors, by genetic and epigenetic factors that also affect facial structure. Genetic and epigenetic factors also influence the breadth of the face, the size of the jaw, the size of the cheek bones and the structure of cheeks, all of which in turn affect voice. These same factors also affect the overall structure of the person. For instance, chest cavity size and lung capacity are both partially genetically determined. These affect the voice, but are also reflective of the overall size of the person. Similarly, genetically determined racial aspects affect both body structure and voice. Even soft-tissue cartilaginous structures are not exempted from this relation. The structure of the nose is genetically determined. The structure of the nose, in turn, affects the quality of the voice, as it affects nasal resonances.

There are environmental, demographic and cultural relationships between voice and persona. The dependence between voice and physical structure is not entirely derived from genetic and epigenetic factors. A number of external environmental and demographic factors too influence both voice and physical and facial structure. For instance, populations whose diets comprise tougher foods requiring more powerful mastication have larger jaws; this affects their voice. Age affects facial structure, by modifying tissue elasticity, which affects the harmonic structure of the signal, and more directly by modifying the pitch itself, lowering it for women and raising it for men. Social, demographic, cultural and many other influences are all also known to affect both physical structure and voice. Thus, one can establish many direct and indirect routes of dependency between the two through these. Indeed, it may be quite impossible to enumerate all the routes through which voice and physical structure are related. What can be established is that the two are linked, through a unique, injective, and possibly bijective relation.

Thus, the voice signal, produced by the vocal tract, has a network of direct and indirect statistical relations to facial and physical structure—the indirect relations being obtained through the relationship of vocal tract structure to facial and physical structure, and the direct relations being obtained through the direct influence of these structures on voice.

The system is configured to navigate through an intricate network of (sometimes tenuous or complex) relationships between bio-physical entities. This is because many parameters have both a direct and indirect effect on the voice signal. For example, age affects voice directly by affecting the tissue composition of the vocal cords. Age also affects facial structure by modifying tissue elasticity outside and within the vocal tract, which affects the harmonic structure of the signal. Thus, age also exerts an indirect influence on voice.

The link between voice and facial structure has likewise been strongly established from many perspectives. As with the rest of the human body, the structure of vocal tract (size and shape of larynx, neck, throat etc.) is determined by both genetic and epigenetic factors. While genetic factors directly influence voice, epigenetic factors can exert both direct and indirect influence on it. The latter category includes factors such as vocation, atmospheric pollution, respiratory diseases etc. Other factors may directly affect the facial structure, and through those, may in turn affect the vocal structures. For example, populations whose diets comprise tougher foods requiring more powerful mastication have larger jaws. Similarly other (epigenetic) factors influence the breadth of the face, the size of the cheek bones and many other facial parts. All these are known to affect the dimensions of the vocal chambers, and through them, the voice. Even soft-tissue cartilaginous structures are not exempted from such a web of relations. The structure of the nose is genetically determined, but epigenetic factors such as climate—and thus distance from the equator—also affect its shape. The structure of the nose, in turn, affects the quality of the voice by affecting nasalence and nasal resonances.

The web of relations deepens, and reinforces those between voice and the human Face when myriad other links are considered. For example facial structure is related to a person's facial appearance. The relation of facial appearance to aggression, and to race, and of aggression and race independently to voice, thereby connect face to voice.

Similar interrelationships link voice to the human body form. Facial structure is directly linked to the overall skeletal structure, mediated by many factors such as age, genetics, ethnicity etc. Indirect links between voice and the human form emerge from the strong relation of voice to these mediating factors. Even though the strength of relationships formed between voice and the entire human form through each mediating factor may be relatively weak, the sheer number of these relationships is large, and they reinforce to yield a strong relationship between voice and the human body form in its entirety.

Only a few mediating factors in the discussion above. In reality, a number of external environmental, social, demographic, cultural and other influences are known to affect both physical structure and voice, thus establishing many direct and indirect routes of dependency between the two. While it may be impossible to enumerate all the routes through which voice and physical structure are related, what can be established is that the two are linked, with possibly a unique, injective, and possibly bijective relations between the two.

The system described herein utilizes these relationships to enable one or more of the following advantages. The system is configured to generate a representation of the user's appearance from a voice signal (or vice versa). The generated representation can complement existing data about the user's appearance to improve a resolution of a representation of a user (e.g., if captured on low-resolution surveillance footage). The system can generate a physical likeness of criminals, victims, or other persons of interest from recordings of their voice in forensic and law-enforcement contexts. The system can generate likenesses for examination in medical contexts. The system can be configured to generate a recreation of the persona to provide medical diagnostic tools (e.g., disease detection and classification tools). The system can be used in social applications, where voices can generate face-to-face communication without cameras, in voice-based social-media applications, etc. The system can generate avatars and characters for gaming or other virtual reality applications. The system can be used for security and surveillance applications where voice recordings are available to improve rendering details for a trespasser or other such subject.

The implementations described herein can provide various technical benefits. For instance, the techniques described herein enable a computer to generate images representing a speaker without prior knowledge of the speaker's appearance and without any images of the speaker. In some implementations, the system can animate the representation of the user using voice signal data also. This can reduce the amount of sensory equipment required to generate a visual representation of a user. Conversely, the system can be configured to generate simulated voice signals of a speaker without recording the speaker's voice. Thus, it can be possible to generate a simulation of the speaker's voice for situations in which recording the speaker is impractical or impossible (e.g., in a loud room, from a distance, etc.).

In an aspect, a computing system for generating image data representing a speaker's face includes a detection device configured to routes data representing a voice signal to one or more processors that generate a response to the voice signal and a data processing device including the one or more processors. The data processing device is configured to generate a representation of a speaker that generated the voice signal in response to receiving the voice signal by performing operations including: executing a voice embedding function to generate a feature vector from the voice signal representing one or more signal features of the voice signal; mapping a signal feature of the feature vector to a visual feature of the speaker by a modality transfer function specifying a relationship between the visual feature of the speaker and the signal feature of the feature vector; and generating a visual representation of at least a portion of the speaker based on the mapping, the visual representation including the visual feature.

In some implementations, parameters of the voice embedding function that specify which of the one or more signal features of the voice signal are included in the feature vector are trained with one or more covariate classifiers that receive image data and voice signals.

Generally, the data processing device is configured to generate an inference of a value for the visual feature based on a known correlation of the one or more signal features of the voice signal to the visual feature of the speaker. In some implementations, a value for the visual feature comprises a size or relative proportions of articulators and vocal chambers of the speaker.

In some implementations, the visual representation comprises a reconstructed representation of a face of the speaker.

Generally, at least one of the one or more signal features of the feature vector comprises a voice quality feature. The voice quality feature is related deterministically to measurements of a vocal tract of the speaker. The measurements of the vocal tract are related to measurements of a face of the speaker. The data processing device is configured to recreate a geometry and of the face of the speaker based on determining the voice quality feature.

In some implementations, the operations of the data processing device further including receiving, from the detection device, data including a template face, and modifying the data including the template face to incorporate the visual feature. Generally, the voice embedding function is trained by a generative adversarial model configured to modify the data including the template face to minimize a difference between a facial feature of the template face and a target value for the visual feature.

In some implementations, the visual feature comprises one or more of a skull structure, a gender of the speaker, an ethnicity of the speaker, a facial landmark of the speaker, a nose structure, or a mouth shape of the speaker.

In some implementations, the operations further include generating a facial image of the speaker in two or three dimensions independent of receiving data including a template image.

In some implementations, the voice embedding function comprises a regression function configured to enable the data processing device to generate a statistically plausible face that incorporates the visual feature. Generally, the regression function is based on training data including voice-face pairs. In some implementations, the voice embedding function comprises a generative model configured to enable the data processing device to generate a statistically plausible face that incorporates the visual feature. The generative model is trained using a generative adversarial model configured minimize a difference between a facial feature in the visual representation and a target value for the facial feature.

In some implementations, the data processing device is configured to receive auxiliary data about the speaker including an age, a height, a gender, an ethnicity, or a body-mass index (BMI) value. The data processing device is configured to estimate one or more body indices of the speaker based on the auxiliary data, where the visual representation of the speaker comprises a full-body representation based on the one or more body indices. The body indices are represented by a vector that includes a number of linear and volumetric characterizations of a body of the speaker. Generally, a relation between visual features and the body indices is modeled by a neural network that is trained from training data including at least one of image data representing faces of speakers and voice signals.

In some implementations, the operations of the data processing device include deriving a whole-body image of the speaker including the visual feature using a deterministic regression based on the one or more body indices. In some implementations, the operations of the data processing device include deriving a whole-body image of the speaker including the visual feature using a generative adversarial model based on the one or more body indices. Generally, the generative adversarial model is configured to minimize a difference between the body indices derived from the visual representation and target body indices. Generally, the visual feature comprises a skull dimension of the speaker.

In an aspect, a computing system for generating a voice signal includes a detection device configured to routes data representing an image data representing a speaker to one or more processors that generate a response to the image data and a data processing device including the one or more processors. Generally, the data processing device configured to generate a simulation of a voice signal in response to receiving the image data by performing operations including: executing a face embedding function to generate a feature vector from the image data representing visual features of the image data; mapping a feature of the feature vector to a signal feature of the voice signal by a modality transfer function specifying a relationship between the visual features of the image data and the signal feature of the voice signal; and generating, based on the mapping, the voice signal to simulate a voice of the speaker, the voice signal including the signal feature.

In some implementations, mapping comprises: determining, by voice quality generation logic, a voice quality of the voice signal including one or more spectral features; and determining, by content generator logic, a style of the voice signal, a language of the voice signal, or an accent for the voice signal that includes the one or more spectral features. Generally, the voice quality generator logic is configured to map visual features derived from facial images to estimates of one or more subcomponents of voice quality. In some implementations, the voice quality generation logic determines the voice quality based on training data including facial image-voice quality pairs. In some implementations, the voice quality generation logic determines the voice quality based on a known relationship between visual features, the known relationship being derived from a plurality of images and voice qualities data. Generally, the one or more spectral features are applied to content generated by the content generator logic to generate the voice signal.

In some implementations, the image data comprises one or both of a 2D image and a 3D rendering of a face. Generally, the face embedding function is trained by a generative adversarial model configured to learn to modify the generated voice signal to minimize an error between voice qualities in the generated voice signal and target values for the voice quality.

The details of one or more embodiments are set forth in the accompanying drawings and the description below. Other features and advantages will be apparent from the description and drawings, and from the claims.

DETAILED DESCRIPTION

Figure 1:
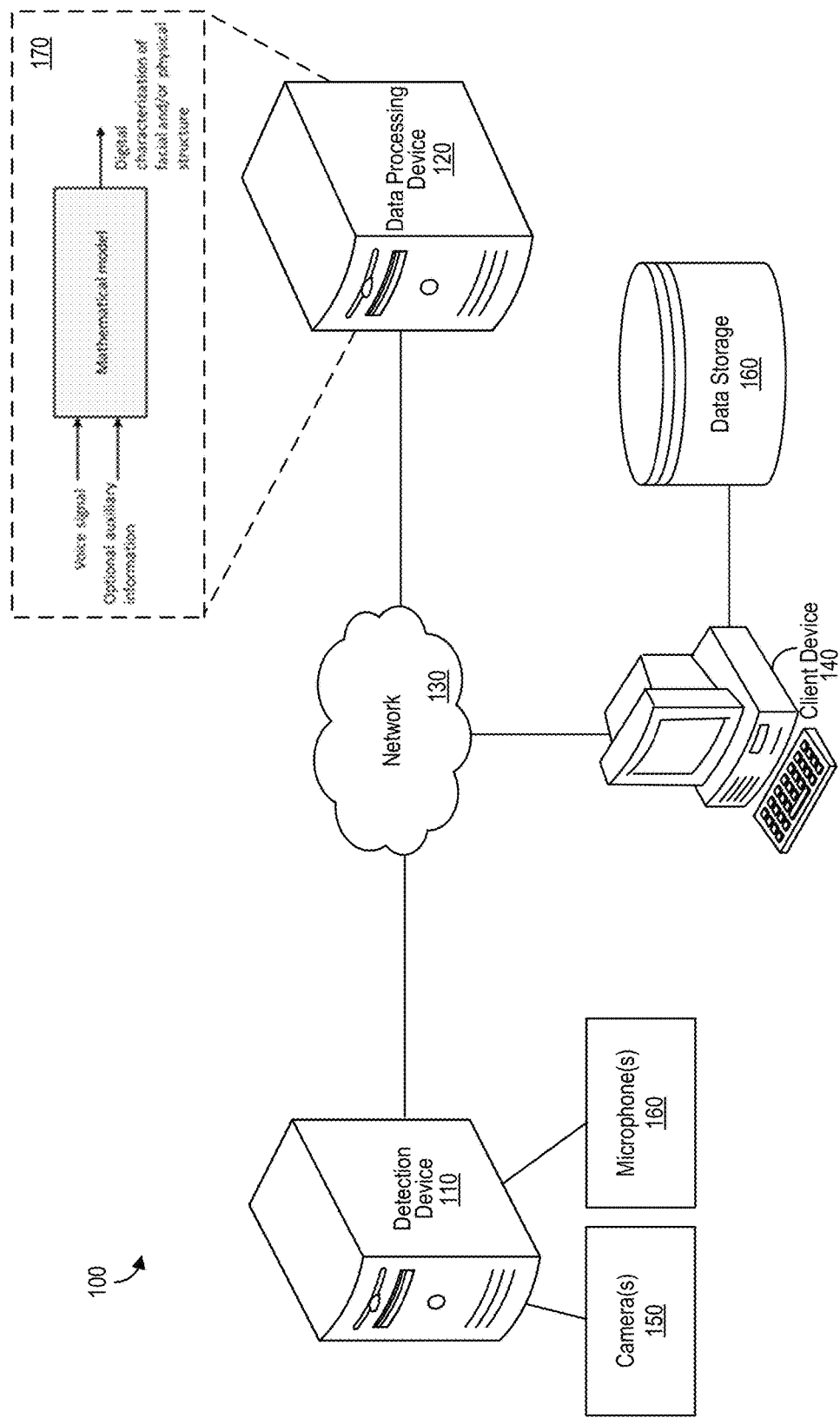
FIG. 1 is a block diagram of an example computing environment for processing speech signals of a user to generate a visual representation of the user, and processing image data representing the user to generate a simulated speech signal of the user.

FIG. 1 is a block diagram of an example computing environment 100 for processing speech signals of a user to generate a visual representation of the user, and processing image data representing the user to generate a simulated speech signal of the user. A detection device 110 is used to collect a speech signal from a source of the speech signal. The detection device 110 routes the speech signal to a data processing device 120 for analysis of the speech signal. The routing can be done, for example, over a network 130. The data processing device 120 is configured to analyze the speech signal to extract one or more features of the speech signal. The data processing device 120 is configured to provide an output, including generating a visual representation of the speaker from the features of the speech signal (also called a forensic profile of the speaker), as a response to receiving the speech signal. The visual representation can be displayed, for example, on a display of a client device 140. In some implementations, the detection device 110, data processing device 120, and client device 140 are including in a single computing system, and the functions of these devices can be executed using one or more processors of the computing system.

The detection device 110 includes a computing device (or plurality of computing devices) for receiving or collecting the speech signal and converting the speech signal into a representation for processing by the data processing device 120. The detection device 110 is generally in communication with one or more sensors measuring the speech signal. The speech signal can be recorded by a sensor such as a microphone and sent to a detection device 110. The microphone 160 can be remote from detection system and can send the speech signal to the detection system over a network 130. The microphone 160 can be local to the detection system.

In some implementations, the detection system 110, includes camera 150 for capturing image data representing a user or speaker. Similar to the process for generating a visual representation of the speaker from features of the voice signal of the speaker, the data processing system 120 can be configured to generate a simulated voice signal based on features of the image data representing the speaker. To do this, the camera 150 captures one or more images of the speaker and sends the images to the detection device. The detection device 110 can send the image data to the data processing system 120 for feature extraction and speech signal simulation. Details as to how the feature extraction, image generation, and speech signal simulation are performed are subsequently described in detail throughout this document.

In some implementations, the speech signal and/or image data can be routed from the detection system 110 to the data processing device 120 when the speech signal and/or image data are received. Processing the speech signal and/or image data immediately upon reception increases signal fidelity upon analysis by the segmentation server 120 and avoids the introduction of signal losses and signal attenuation that can be introduced during signal transmission or storage. In some examples, the speech signal and/or image data can be collected and stored in a data storage 160 for later processing. In some examples, information associated with how the speech signal and/or image data are encoded, stored, compressed, or otherwise altered by the detection system 110 prior to signal analysis by the data processing device 120 is preserved. The alteration information can be used during analysis by the data processing device server 120 to increase the accuracy of the profile parameter prediction values.

Overall, the data processing device 120 is configured to generate data representing a prediction of facial and other physical structures of a speaker from his or her voice, and also to simulate the speaker's voice from images of the speaker's appearance. The data processing device 120 is configured to execute operations including extracting features of the voice signal or speech signal and transforming the speech signal or image data by using a mathematical model. The model (described below) relates the speech data to an appropriate digital characterization of the facial and other physical structure of the person, or in the case of simulating speech, relates image data to speech features. The data processing device 120 is configured to generate data representing a prediction of a characterization of the physical structure of the person with a visual presentation or the digital form. Conversely, the data processing device 120 can generate a simulated speech signal (e.g., to be output by an output device such as a speaker of the client device 140) that includes the predicted features as determined from the image data.

The task of accurately reconstructing the human face from voice poses many challenges. A face that is reconstructed from voice must look like the face of the speaker in real life. Of course, not all details might be possible to estimate or reconstruct, now or perhaps ever in the future. One example is hairstyle, or choice of facial grooming—these entities have no correlation with voice. For the reverse—reconstruction of voice from face—the challenges are deeper. Facial structure cannot predict the language spoken by a person, cannot predict the personality, learning, style, experiences, and thought processes of the speaker—all of which influence and modulate the speech produced. In the reverse, perhaps only the quality of the speaker's voice can be estimated. Or, in other words, only the voice, in its strictest definition as a non-modulated signal, can be reconstructed accurately.

When it comes to the reconstruction of the full body from voice, there are greater challenges. The data processing device 120 receives enough information in speech signals and/or image data to make reasonably good physically and statistically supported guesses for generating a representation of the speaker's appearance from the speech signals and/or for simulating the speaker's voice from the image data.

To generate a representation of a speaker's appearance from speech signals, the data processing device 120 begins reconstruction of the speaker's physical appearance with first solving the problem of facial reconstruction from voice. Generally, computer algorithms locate and use joint positions on two-dimensional (2D) images for reconstruction or estimation of body configuration and shape in three dimensions (3D). This is because those key positions carry more information relevant to the task. Following this reasoning, for reconstructing the entire human form from voice, the data processing device 120 begins with reconstructing the speaker's face and rather than the speaker's joints, since voice carries relatively less implicit evidence of body geometry, or joint positions.

When it comes to actual methodologies, there are multiple ways to approach the problem of reconstruction. One approach is based on leveraging models, such as model 170, which emulate the physics and bio-mechanics of voice production. Physical models of the vocal tract can explain the resonant characteristics of the voice signal. Bio-mechanical models of the vocal tract can explain the energy distribution and other spectral characteristics of voice, including many voice qualities. For physical models, such as an acoustic tube model, the model 170 can approximate the spectral characteristics of voice, given the dimensions of the vocal tract of the speaker. The three-dimensional geometry of the vocal tract is highly correlated to the speaker's skull, and thereby to the speaker's facial structure. Once the data processing device 120 estimates one of these entities, it is possible to estimate the other two through these geometrical relationships. Because each of the skull or vocal tract geometry is related to voice, then the other two can also be related to voice by corollary.

To reconstruct facial structure from voice, the data processing device 120 receives data representing a vocal tract geometry for use as intermediary data. The data processing device 120 estimates vocal tract geometry by matching the spectral patterns computed from the voice signal to the dimensions and properties of the model 170 that best approximates them. Once the data processing device 120 determines the vocal tract dimensions of the speaker, the data processing device 120 estimates the skull and facial dimensions of the speaker.

Conversely, to reconstruct a voice from facial structure, the data processing device 120 executes a reverse version of the above-described process. The data processing device 120 first estimates the dimensions of the vocal tract that best fits the facial structure (in 3D), then estimates the spectral characteristics of the voice such that it best matches those of the model that best approximates the estimated vocal tract. The model 170 of the data processing device 120 can incorporate both the dimensions and properties of the vocal tract, resulting in estimates of a number of voice qualities as well, which can then be used to synthesize a voice signal that has the estimated characteristics.

In some implementations, the data processing device 120 uses a concatenated tube model to estimate the physical representation of the speaker. Given a speech signal and an initial estimate of the number of concatenated tubes in the model 170, the data processing device 120 estimates reflection coefficients at the various junctions and thereby the ratios of the areas of the adjacent tubes. Conversely, given a tube model (e.g., for model 170) with specification of tube lengths and area ratios, the data processing device 120 estimates a transfer function of the vocal tract and thereby the features of the speech signal. In some implementations, the data processing device 120 can estimate relationships with greater accuracy when given lossy tube models which also consider tissue characteristics and other known characteristics, augmented by model extensions to account for the anti-resonances of the nasal passage and its area ratios. There are other approaches to reconstructing facial structure from voice and vice-versa. A set of exemplary approaches based on AI techniques are subsequently described in the sections below.

At the outset, it is important to note that mapping is different from reconstruction. Generally, given a voiceprint, the data processing device 120 is configured to select a representation of a face from an ensemble of available faces, such that the voice of the chosen person matches the given voiceprint. This process is called true mapping, and requires that an ensemble of face-voice pairs be available to choose from. When such an ensemble is not available, the data processing device 120 estimates a representation of a speaker's face in-vacuo from the voice sample, which is referred to as true reconstruction. When mapping is an intermediate stage in estimating a face, or vice-versa, it is called transformative reconstruction or transformative mapping, respectively. In such a framework, a face is chosen from an ensemble based on voice-matching criteria, and thereafter modified according to voice-based corrections to its features. Each of these techniques is described herein. Additionally, true reconstruction is further discussed in relation to the generation of the voice of a person from their facial images.

Generally, there are two broad approaches to the problem of estimating a face from voice. The first approach includes a knowledge-driven approach. In this approach, the data processing device 120 generates data representing inferences relating to the size and relative proportions of the articulators and vocal chambers, and other relevant parts of the vocal tract, from their known correlations with properties derived from the voice signal. The majority of such correlations that are usable currently relate to various sub-components of voice quality. The second approach includes a data-driven approach. In this approach, the data processing device 120 is configured to learn to (directly or indirectly) map or reconstruct the image of a face from voice, given examples of both.

For reconstruction in a knowledge-based setting, the data processing device 120 estimates secondary facial features from voice-derived facial features through known relationships. The data processing device 120 algorithmically coalesces the estimates of the facial features to form a complete image of the speaker's face.

For reconstruction in a data-driven setting, the data processing device 120 receives or trains a predictor, which is used to generate either the image of the face directly, given voice, or to generate facial features that can be used by a reconstructor (e.g., a module of the data processing device 120) to reconstruct the face. Generally, the reconstructor is either knowledge-based or data-driven. For knowledge-based reconstructors, the data processing device 120 generates heat maps (e.g., contour maps) of faces, and additionally geometrically fills in the facial characteristics. For data-driven reconstructors, the reconstructor generally is trained using pairs of facial features and corresponding full faces.

An Example Algorithm for Mapping

Generally, a mapping by the data processing device 120 includes generating a binary yes/no decision in response to receiving face-voice pairs. In data-driven settings, the data processing device 120 makes decisions by directly matching the derived features, or learning common embeddings from voice and face for matching. If the data processing device 120 directly infers features of the speech signal from features of the image data, the data processing device 120 is making an implicit assumption that the two modalities directly inform about one another, which is not always the case. For example, facial structure can be dependent on gender, age, etc. The same is true, independently of the face, for voice. For example, males of a certain age range have distinctly male voices and faces, and females of a certain age range have distinctly female voices and faces. A large part of the relationship between the two, thus, is predicated on gender, age, and so forth. Other similar factors can link facial features to vocal features.

The model 170 for mapping of the data processing device 120 accounts for these underlying linking factors (or covariates) between voice and face. The model described below (which can be an example of model 170) does so in the form of embeddings that permit voices and faces to be compared to one another in common mathematical spaces.

One such type of embedding could be one that can be used to predict covariates which would ideally be the same covariates—from either voice or face data from the same person. For example, the model 170 assumes that a voice sample V is related to the image of a face F through a (discrete-valued, for simplicity) covariate C. C(v) and C(f) refer to the covariates related to voice v and face f. This applies to every covariate C∈C. There are defined: a voice embedding function $F_v(v;\theta_v):v \to \mathbb{R}^d$ d-dimensional vector parameters $\theta_v$ that maps v into a d-dimensional vector; and a face embedding function $F_f(f,\theta_f)$ be a face embedding that maps f into a d-dimensional vector. The data processing device 120 is configured to learn the parameters $\theta_v$ and $\theta_f$ in a manner that the corresponding embeddings are comparable. For each covariate, a classifier $H_C(x; \varphi_C)$ with parameters $\varphi_C$, assigns any input $x \in \mathbb{R}$ to a value for C. The classifier is agnostic regarding from which modality x was derived. For example, x can be the d-dimensional vector output (feature) of either the voice embedding function or the face embedding function.

For each v (or f) and each covariate C, the data processing device 120 is configured to compute a loss $L(H_C(Fv(v; \theta_v)\varphi_C), C(v))$ between the covariate predicted by $H_C(.)$ and the true value of the covariate for v, C(v). The total loss L over the set of all voices V and the set of all faces F, over all covariates, is given by:

$$\mathscr{L}(\theta_v, \theta_f, \{\phi_C\}) = \sum_{C \in \mathscr{C}} \lambda_C \left( \sum_{v \in \mathscr{V}} L(H_C(F_v(v; \theta_v); \phi_C), C(v)) + \sum_{f \in \mathscr{F}} L(H_C(F_f(f; \theta_f); \phi_C), C(f)) \right) \quad (1)$$

The parameters of the embedding functions, $\theta_f$ and $\theta_v$, are learned by performing the optimization:

$$\theta_v^*, \theta_f^*, \{\phi_C^*\} = \underset{\theta_v, \theta_f}{\operatorname{argmin}} \min_{\{\phi_C\}} \mathscr{L}(\theta_v, \theta_f, \{\phi_C\}) \quad (2)$$

Figure 2:
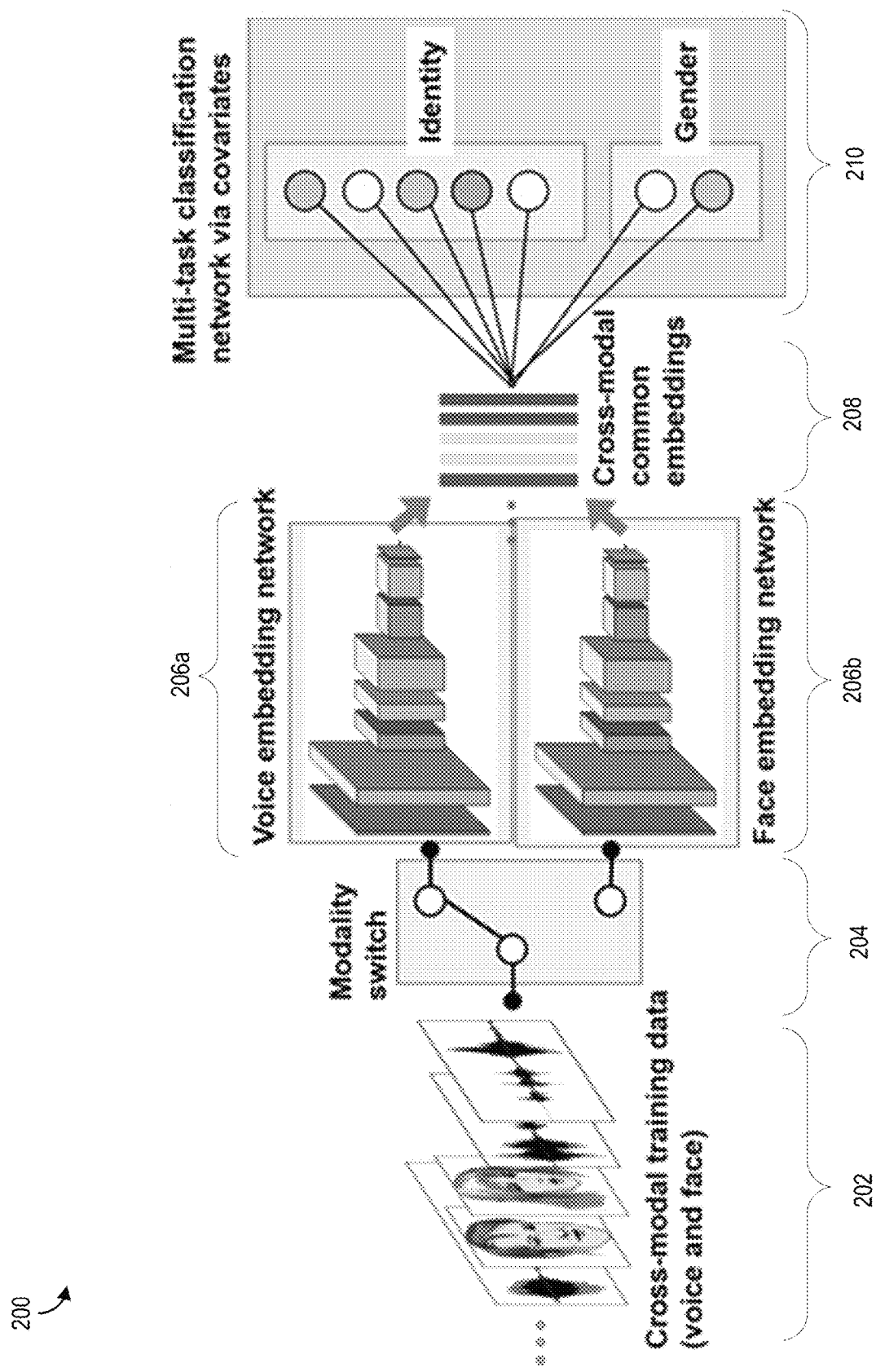
FIG. 2 shows an example of a network for training the data processing device.

The voice and face embedding functions can take potentially any form. In a specific formulation called a Disjoint Mapping Network (DIMNet), the features $F_v(v; \theta_v)$, $F_f(f; \theta_f)$ and $H_C(x; \varphi_C)$ can be instantiated as neural networks. The network's architecture 200 is shown in FIG. 2. It comprises three main components. First, the network architecture 200 includes a voice network 206a that represents $F_v(v; \theta_v)$, which extracts d-dimensional embeddings of the voice recordings. The architecture includes a face network 206b that represents $F_f(f; \theta_f)$, which extracts d-dimensional embeddings of face images. The architecture 200 includes a bank of classification networks 210, which includes one network per face-voice feature covariate considered. Each classification network 210 serves to classify one covariate (e.g. gender), and operates on the d-dimensional features from the embedding networks. The architecture 200 also includes cross-modal training data 202 which trains the networks 206a and 206b. The training data 202 is received by the appropriate network 206a, 206b using a modality switch 204, which routes the training data down a data flow of the architecture. Cross-modal common embeddings 208 are generated from each of the networks 206a, 206b and sorted into the classifiers 210.

More specifically, during training, voice recordings of the training data 202 are input into the voice-embedding network 206a, and facial images of the training data 202 are input into the face-embedding network 206b. A switching operation is illustrated by the switch 204 at the input in FIG. 2. $F_v(.)$ and $F_f(.)$ can each include convolutional neural networks. The output of the final layer of $F_v(.)$ is pooled over time to obtain a final d-dimensional representation. Outputs 208 of the embedding networks 206a and 206b are input to the covariate classifiers 210. The classifiers $H_C(.)$ can each be simple multi-class logistic regression classifiers comprising single softmax layers. At any time the data processing device 120 can be operating on voice data, or on image data. In other words, the data processing operations of the data processing device 120 on speech signals and on image data are generally disjoint. Updates of the two network parameters are also disjoint. For example, when the data processing device 120 computes loss gradients when the input is a speech signal, these loss gradients are only used update the voice network 206a. Additionally, loss gradients determined from image data are used by the data processing device 120 to update the face network 206b. However, both determined loss gradients contribute to updates of the classification networks 210.

An appropriate loss (eg. a cross-entropy loss) could be used to optimize the networks. In practice, instead of the optimization in Eq. (2), the actual optimization can be performed as below. The difference is inconsequential.

$$\theta_v^*, \theta_f^*, \{\phi_C^*\} = \underset{\theta_v, \theta_f, \{\phi_C\}}{\operatorname{argmin}} \mathscr{L}(\theta_v, \theta_f, \{\phi_C\}). \quad (3)$$

The parameters of such a network 200 can be trained through backpropagation, using stochastic gradient descent. For voice input, voice embeddings are computed using $F_v(v; \theta_v)$. The data processing device 120 computes losses using classifiers $H_C(.)$ for all the covariates, and the loss gradient is back-propagated to update the voice network 206a as well as the covariate classifiers 210. The same is done for the face data. The back-propagated loss gradients are used to update the face network 206b and the covariate classifiers. Thus, the embedding functions are learned using the data from their modalities individually, while the classifiers are learned using data from all modalities. For better generalization, more covariates can be used by this model. Once trained, the embedding networks $F_v(v; \theta_v)$ and $F_f(f; \theta_f)$ can be used to extract embeddings from any voice recording or face image.

This is directly useful for mapping: given a voice recording v and a face image f, we can now compute a similarity between the two through the cosine similarity $$S(v, f) = \frac{F_v^T F_f}{||F_v||F_f||}.$$

The data processing device 120 uses this distance value to evaluate the match of any face image to any voice recording. This enables the data processing device 120, for instance, to rank a collection of faces $f_1, \ldots, f_K$ in order of estimated match to a given voice recording v, according to $S(v, f_i)$, or conversely, to rank a collection of voices $v_1, \ldots, v_K$ according to their match to a face f, on order of decreasing $S(v_i, f)$.

As stated previously, the relationship between voice and physical structure is complex, with a large number of latent variables linking the two through a complex network of relationships. In order to find an accurate mathematical relationship between voice and physical appearance from the voice signal and the image data, the data processing device 120 develops the models 206a, 206b for these latent dependencies through appropriately structured machine-learning models as subsequently described in relation to FIG. 3.

The model 170 of FIG. 1 shows a logic module including a portion of a voice transformation logic. The data processing device 120, to execute the model 170, receives a voice signal (also called a speech signal) as input data. The data processing device 120 optionally receives auxiliary data that is related to source or speaker that generated the voice signal. For example, the auxiliary data can include data identifying a gender, age, race, or other demographic feature about the speaker. The data processing device 120 executes the model 170 to obtain a digital characterization of the physical structure of the speaker, such as the facial structure. While this model 170 is described at a high-level here, further examples as described in relation to FIGS. 3-5, below.

The voice signal may be represented in any manner, for instance directly as a stream of samples, as a time-frequency characterization such as a spectrogram, high-resolution characterizations such as wavelets, cochleograms or correlograms, etc. The speech signal may also comprise learned representations derived from the signal, for example through a learned neural network.

The data processing device 120 generates digital characterizations of the physical features (including facial features) of the speaker. The digital characterizations include a set of numbers such that they may be used to reconstruct the physical appearance of the speaker. The reconstruction may take one or more of several forms. For example, a first form includes a rendering of collections of key points on the face of body in two or three dimensions. For example, a second form includes a full two dimensional or three-dimensional rendition of the speaker's persona. A third form includes a wire mesh construction of the face and/or body of the speaker, etc. The digital characterizations may either comprise actual numeric representations of the above, or low-dimensional projections obtained through methods such as principal component analysis of the more detailed descriptions. The data processing device 120 can generate a reconstruction representing a complete structure of the speaker or a portion of him or her.

Generally, digital characterizations of facial or physical structure of the speaker are referred to as "physical parameters". Physical parameters effectively represent the physical structure (including facial features) of the speaker. References to "physical parameters" are generally references to digital characterizations by the data processing device 120 physical parameters (including facial features) of the speaker.

The parameters of the mathematical model themselves may either be learned from the known physics or statistical relationships that relate the physical structure to voice, or from data comprising voice recordings and associated three-dimensional or two-dimensional recordings of the speaker, as static images, movies, or any combination or derivative of these from which a reconstruction of the physical structure of the speaker's face and/or body is feasible.

The data processing device 120 generates a visual recreation of a speaker's persona from voice that may be implemented by using one or more of a posterior prediction network, generative adversarial network, and a distribution transformation framework.

Generally, the physical parameters of the speaker are subsequently represented as the symbol $\Theta$. Generally, $\Theta = [\Theta_f, \Theta_b]$, where $\Theta_f$ represents face structure parameters and $\Theta_b$ represents body structure parameters. This decomposition is performed in this document to explicitly distinguish between face and body parameters. We will represent the speech signal from the speaker by the symbol s.

Posterior Prediction

Figure 3:
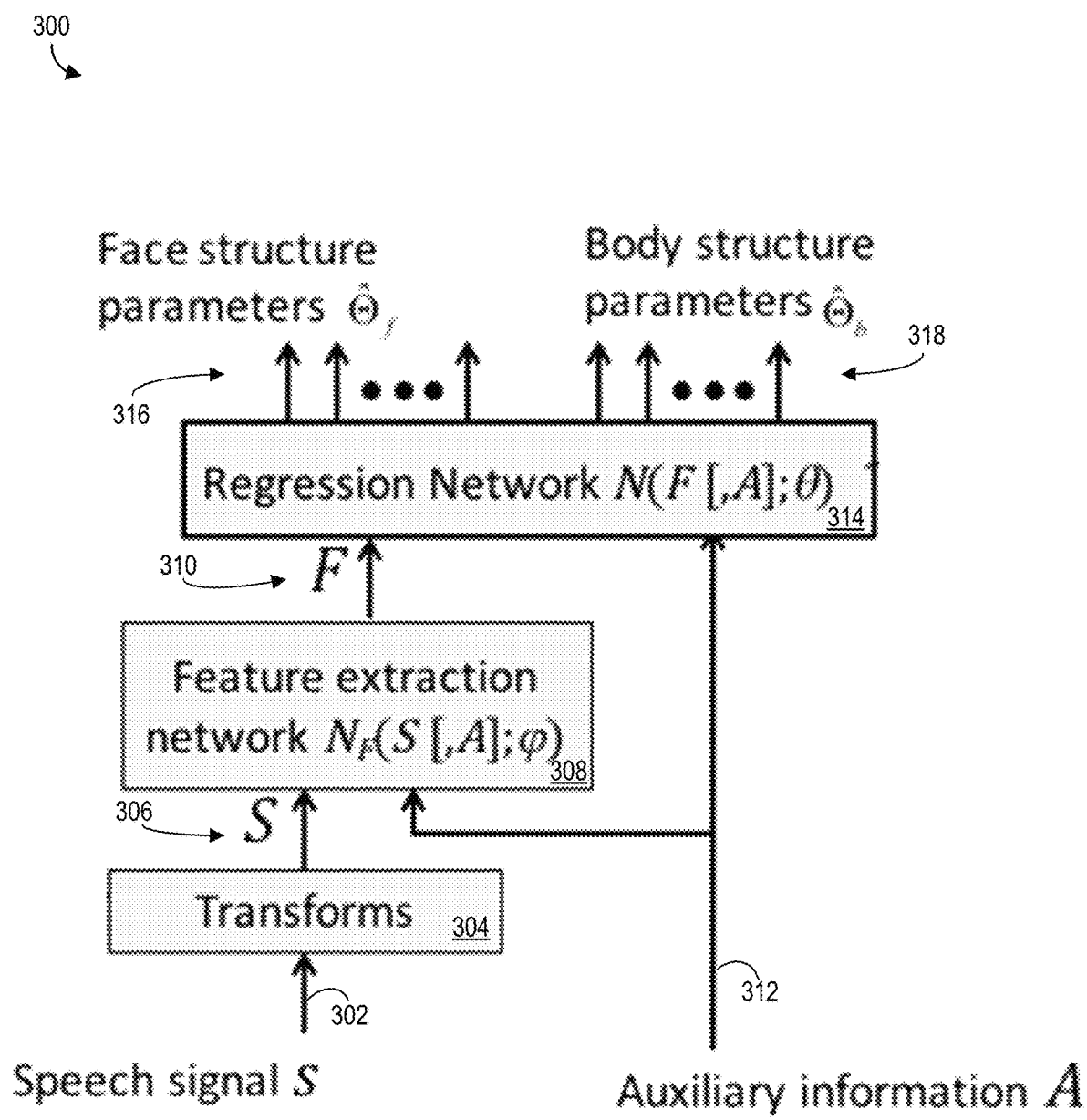
FIG. 3 shows an example process to convert voice signals and optional auxiliary information about the speaker to a digital characterization of the facial and/or physical structure of the person.

A first version of the model 170 previously described for the data processing device 120 includes a "posterior prediction" model 300, as shown in FIG. 3. The posterior prediction model 300 includes a direct regression from the speech signal to the physical parameters of the speaker. The actual regression may be performed by any form of regression model, including but not limited to a linear or non-linear regression, support vector regression, or a neural network. Below, while one specific instance of such an model is described, where the regression is performed using a neural network, other similar versions of this model can be used with other classification networks. These models are generally called "posterior prediction networks."

The data processing device 120 includes specifically designed network architectures for the problem based on the following factors. First, information is embedded both in the instantaneous and temporal progression of the speech signal. Second, when multiple independent inputs are presented to the regressor, it is inefficient for the data processing device 120 to obtain independent estimates for each input. Instead, it is more effective for the data processing device 120 to use additional inputs to refine estimates obtained from previous inputs. Third, the model 300 effectively utilizes auxiliary information 312, such as gender, race, and other demographic data about the speaker, to improve predictions when presented. However, the predictions need not be contingent on the availability of these inputs.

The data processing device 120 converts the input speech signal s 302 to a stacked multi-resolution spectro-temporal representation S 306 using a set of transforms 304, such as (including but not limited to) short-time Fourier transforms, wavelet transforms, constant-Q representations, and so forth. The data processing device 120 further transforms the multi-resolution representation S 306 by a convolutional neural network $N_F(S; \varphi)$ 308, where $\varphi$ represents the parameters of the network, to produce a higher-level feature representation F 310. This network is called a "feature computation network." When the auxiliary information 312 is provided about the speaker, the network 308 may also accept the auxiliary information when computing the higher-level features as $F=N_F(S, A; \varphi)$.

The data processing device 120 then provides these higher-level features F 310 are to a neural network regression model N (F; θ) 314, where θ represents the parameters of the network. The neural network regression model 314 may be any form of network, e.g. any combination of multi-layer perceptrons, convolutional neural networks, and recurrent neural networks. For example, a bi-directional recurrent neural network can be used. The design of the network is such that it can also accept auxiliary information A 312. In this case, the network 300 represents the regression model N(F, A; θ) 314.

In response to F (and, optionally, auxiliary information A), the network 314 produces an estimate $\hat{\Theta}$ of the true body parameters Θ of the speaker who produced the signal. These may include estimates of the physical parameters that represent face structure $\hat{\Theta}_f$ 316 and estimates of physical parameters that represent body structure $\hat{\Theta}_b$ 318. Alternately, the network may predict any subset of these parameters ($[\hat{\Theta}_f, \hat{\Theta}_b]$) as required. The data processing device 120, by the network 300, performs joint prediction of all of these parameters, under the principle that joint prediction is likely to account for interdependencies between the parameters in a manner that independent prediction of the individual parameters would not.

The parameters of the model, namely the parameters of the feature-extraction network φ 308, and the regression network θ 314, may be jointly or independently estimated using any learning paradigm used to train neural networks. The learning paradigm estimates these parameters such that the error between the (predicted subset of the) true body parameters Θ that correspond to the speaker who produces a signal s, and the ones estimated by the network, $\hat{\Theta}$, is minimized.

The framework for this embodiment allows a great deal of latitude in the structure of the network, the constraints applied, the learning paradigms, used to train them, etc. The learned model can subsequently be applied to any speech recording to make predictions about the physical parameter of the speaker.

Generative Adversarial Network and Distribution Transformation Framework

In some implementations, the data processing device 120 can implement the previously described functionality using either Generative Adversarial Network (GAN) or Distribution Transformation Framework (DTF). Both GAN and DTF are based on the principle of modeling the conditional distribution of physical parameters through a "generative model". Specifically, they model the conditional probability distribution P(Θ|s) of the body parameters Θ of the speaker who produced a signal s. Subsequently, given only a signal s, the body parameters estimate $\hat{\Theta}$ is computed as the estimated mean of the conditional distribution P(Θ|s).

These models also optionally simultaneously represent the conditional probability of the auxiliary information about the speaker, conditioned on both the input speech and the physical parameters. In this case, the models represent the probability distribution P(Θ,A|s), where A represents the auxiliary information about the speaker.

The probability distributions to be learned are complex and are not easily learned through conventional means. Standard maximum-likelihood estimators are unable to capture the complexity of the distribution. The GAN and DTF are different by employing variants on frameworks that enable learning complex distributions through transformation of a simpler random variable drawn from a simpler distribution.

The GAN Framework

Figure 4:
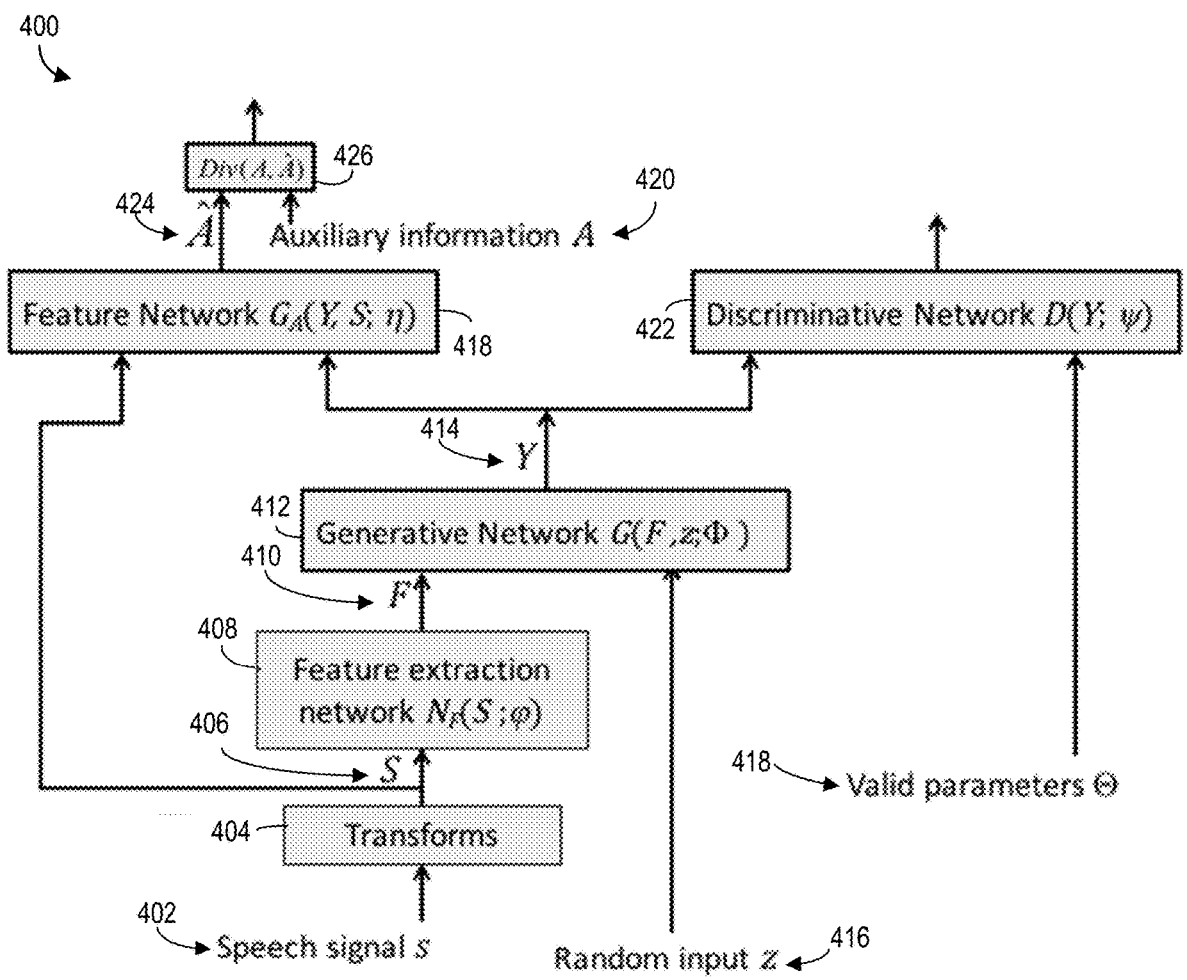
FIG. 4 shows an example process for voice transformation implemented by using a Generative Adversarial Network (GAN) structure.

Turning to FIG. 4, the Generative Adversarial Network (GAN) 400 employs a parallel adversarial network within it to learn the conditional distribution of physical parameters given speech. In the GAN 400, the speech signal s 402 is first transformed to a multi-resolution spectro-temporal representation S 406 using a set of transforms 404. The multi-resolution representation is then further transformed by a feature computation network $N_F(S;\varphi)$ 408 (with parameters φ) to produce a higher-level feature representation F 410.

The generative model itself comprises a neural network G (F, z; Φ) 412 that takes as inputs the higher-level feature F 410 derived from the speech, along with a random vector z 416 generated from a standard distribution such as a standard Gaussian distribution. The output of the network Y 414 is ideally a high-probability draw from the true conditional distribution of the physical parameters given the speech, P(Θ|s).

The adversarial network D (Y; ψ) 422 is a discriminative network that is optimized to distinguish between real sets of physical parameter values, representing measurements of an actual speaker, and synthetically created physical parameter values that may not represent a real speaker. Practically, D (Y; ψ) 422 is a function whose outputs take a different range of values when Y is a set of physical parameters taken from a real person, than when it is not. For instance, D (Y; ψ) 422 may preferentially output a positive number when the input Y 414 is a vector of physical parameters from a real person, and a negative number when it is not. ψ represents the parameters of the discriminator, which can be learned to maximize the accuracy with which the discriminator distinguishes between inputs from real and synthetic or fake sets of physical parameters. The discriminative network 422 is optimized to distinguish between the outputs of the generative network and valid physical parameters 418 of a speaker.

The GAN learning framework 400 optimizes the parameters of the generative model, such that draws from this model can "fool" the adversarial network into classifying the draw as a valid measurement from a real person.

When auxiliary information A 420 about the speaker is expected to sometimes be provided, the output of the generator Y 414 is fed, along with the multi-resolution features S 406 derived from the speech signal to a second-level "auxiliary feature" network $G_A$(Y, S; η) 418 that produces estimates Â 424 of the auxiliary information, from the physical parameters and the speech signal. The auxiliary feature network $G_A$(Y, S; η) 418 represents a generator of the conditional probability distribution P(A|Y, s). η are the parameters of this network, which can be optimized such that the outputs of $G_A$(Y, S; η) in response to an input Y 414 along with the signal s 402 that was used to generate it most closely approximates draws from P(A|Y, s).

All parameters, including the parameters of the feature computation network φ, the parameters of the generator Φ, the parameters of the discriminator ψ, and, optionally, the parameters of the auxiliary feature network η may be learned from training data using any appropriate training paradigm for neural networks. In the most common approach, they are jointly trained such that the accuracy of the discriminator, and the ability of the generator to "fool" the discriminator with the values it outputs in response to speech signals are maximized, while the error of the auxiliary network in predicting the true auxiliary information of the speaker from the speech signal and the output of the generator is minimized. Once trained, the discriminative components of the system are no longer required and may be discarded. Also, once trained on appropriate training data, the generative model can be employed to generate the physical parameters of the speaker of a recording—a process called "inference".

During inference, given a novel speech signal s 402, the multi-resolution spectro-temporal features S 406 are first extracted from the speech signal. Higher-level features F 410 are derived from the spectro-temporal speech features by the feature-computation network, $N_F(S; \varphi)$ 408. The higher-level features F 410 are then input, along with a random vector z 416 (drawn from the same distribution used during training) into the generator network G (F, z; $\Phi$) 412. This process is repeated several times using different random vectors $z_1, z_2, \ldots, z_N$ to produce many outputs $Y_1=G(F, z_1; \Phi), Y_2=G(F, z_2; \Phi), \ldots, Y_N=G(F, z_N; \Phi)$. The final computed physical parameter for the voice signal is obtained as the average:

$$\hat{\Theta} = \frac{1}{N}\sum_1^N Y_i.$$

In the event that auxiliary information A 420 is also provided along with the speech signal 402, the generated parameter vector Y 414 is input to the auxiliary feature network $G_A(Y, S;\eta)$ 418, which produces auxiliary measurements A 424. The process is repeated with several random inputs $z_1, z_2, \ldots, z_K$ until the data processing device 120 obtains one or more generations in which the auxiliary measurements output by the auxiliary feature network match the externally provided auxiliary information, or div(A, Â)<$\epsilon$, where div( ) is a divergence function 426 that quantifies the difference between its inputs, and $\epsilon$ is a prespecified threshold. The final physical parameter estimate is obtained as the average of the generated physical parameters that, when fed to the auxiliary feature network, also produced auxiliary measurements that matched the provided auxiliary information. For example, mathematically, let $z_1, z_2, \ldots, z_L$ be the set of random inputs to G (F, $z_i$; $\Phi$) 412, such that div(A, $\hat{A}_i$)<$\epsilon$, where $\hat{A}_i=G_A(G(F, z_i;\Phi), S;\eta)$. Then, the estimated physical parameter values are given by the "selected" average $$\hat{\Theta} = \frac{1}{L}\sum_1^L Y_i,$$

where by the term "selected", we emphasize the fact that the averaging is only performed over the selected outputs $Y_i$ such that the auxiliary information estimated from these values approximates the given auxiliary information values A to within the acceptable error $\epsilon$.

The Distribution Transformation Framework (DTF)

Figure 5:
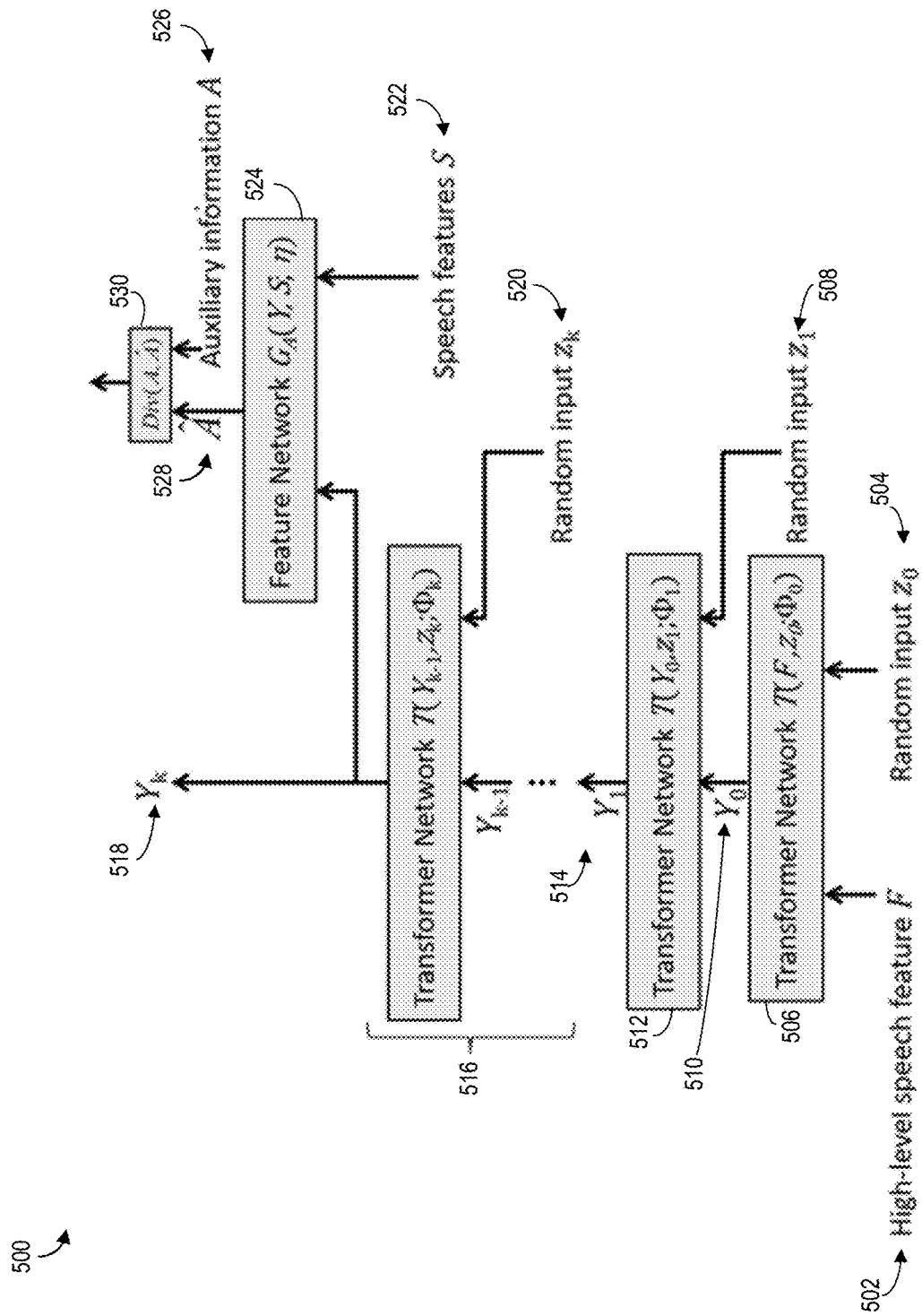
FIG. 5 shows an example process for a voice transformation system implemented by using a Distribution Transformation Framework (DTF) structure.

Turning to FIG. 5, the data processing device 120 implements a DTF 500 by allowing standard parametric probability distributions to be converted to more complex ones through a series of invertible transformations to model P($\Theta$|s).

Like in the GAN, the high-level features F 502 are derived from the speech signal through a combination of single- or multi-resolution signal analysis, followed by a feature extraction network $N_F(S;\varphi)$ (not shown). Here, the high-level features F 504 extracted are combined with a random draw $z_0$ generated from a standard parametric distribution such as a Gaussian, which is then transformed by a "transformer" network T(F, $z_0$; $\Phi_0$) 506. The output $Y_0$ 510 of the transformer network may be combined with a random draw $z_1$ 508 from a second parametric distribution and passed through a second-level transform T($Y_0$, $z_1$;$\Phi_1$) 512. A number of transforms T($Y_{k-1}$, $z_k$; $\Phi_k$), k=1 ... K may be chained in this manner, including outputs 514 from previous transformer networks.

The overall chain of transformers 510 and 512 effectively transforms the combination of parametric distributions representing the joint distribution of the input random draws $z_0, z_1, \ldots, z_K$ 520 to the conditional distribution of physical parameters of the speaker P($\Theta$|s), conditioned on the input speech s. The output 518 of the final layer of this network in response to a speech signal and draws from the input parametric distributions represents draws from this conditional distribution. The parameters $\Phi_i$, i=0 ... K of the multiple stages of transformer networks are learned such that the overall distribution represented by this generative model closely models the conditional distribution of the physical parameters of speakers, conditioned on their voice signals.

When auxiliary information about the speakers is provided the network is augmented as before by an auxiliary network $G_A(Y,S;\eta)$ 524 to generate predictions of the auxiliary inputs. The outputs $Y_K$ 518 of the final layer of the transformer network, representing draws from the conditional distribution P($\Theta$|s), may be combined with high-level features S 522 from the input speech and passed to the auxiliary network to predict auxiliary information that may be provided with the speech signal.

The entire model may be trained, i.e. the parameters of the transformer networks $\Phi_i$, i=0 ... K, the feature network parameters $\varphi$, and, optionally, the auxiliary network parameters $\eta$ may be learned from training data using the method of variational approximations. This method attempts to learn parameters to maximize the likelihood of the training data. Both during training and during operation, the system tries to minimize the difference between the output Â 528 of the auxiliary feature network and the actual auxiliary information A 526, as computed by the divergence function 530.

Inference for estimating body parameters given a speech signal and, optionally, auxiliary information about the speaker, is performed analogously to the generative models in the GAN framework.

Transformative Reconstruction

The embeddings that the data processing device 120 generates though a model such as the one described above, serve as features that can be used within a transfer learning framework to generate faces. This process is a transformative reconstruction, where a matched face is modified using additional procedures.

In a transfer learning framework, the model previously described is used to generate embeddings, which form the input for another model that learns the relationships of these to a face. Using the model the data processing device 120 either learns to map the embeddings directly to a face, or to transform the mappings to specific facial features that can then be geometrically extrapolated to yield the image of a face.

Generally, transformative mapping serves the goal of true reconstruction: once the embedding network is trained, given a voice signal the data processing device 120 is configured to generate a visual representation of the speaker's face. However, for true reconstruction, generally no intermediate mappings are needed.

The simplest data driven mechanism that might learn to generate a face from a voice is one that taken in the voice signal as input, and yields the facial image as output. Such a mechanism still implicitly learns mappings from voice to face, and to be able to function, must be trained using matched voice-face pairs. In all other extensions and embodiments of a data driven mechanism, such pairs are needed in the training phase in one form or another.

A system for true reconstruction is generally a knowledge-based one. One such embodiment might be where voice quality features from the voice signal are related deterministically to measurements of parts of the vocal tract, and those to measurements of the face (such as facial proportions from landmarks), and those in turn are used to recreate the geometry and features of the face. Methodologies for geometrical reconstruction of faces from estimates of landmarks or other measurements and transformations, in 2D and 3D, are developed in the field of computer vision.

For generating reconstructions, the data processing device 120 determines appropriate features from the face and voice. Feature computation from voice has been extensively dealt with in earlier chapters. In most data driven systems, where appropriate, the image of the face is directly used after minimal normalizations, such as size (preserving aspect ratio), color, texture and other variations that are spurious to the estimation process. Generally, transformative mapping achieves the goals of being able to create new faces in response to new voices, once trained.

Reconstruction of Voice from Face

The data processing device 120 is also configured to generate simulations of voice signals of speakers from features of images of the face of the speaker. A person's face is predictive of their voice. Generally, the vocal tract that generates voice also partially defines the geometry of the face and vice-versa.

Relative to computation of features from voice signals, the computation of features from image data by the data processing device 120 is vastly simplified. The specific measurements of facial parts (in 2D or 3D) comprise the features. The data processing device 120 maps these features to voice quality measurements. This is so because those are the only aspects of voice that are expected to be predictable from face.

The problem of voice generation from face then becomes that of prediction of voice quality features, and of generating a voice signal with those specific qualities. In other words, measurements of the voice qualities of the generated voice match the algorithmic estimates (or predictions) of the measurements. Note that in using the term "quality," voice signal characteristics such as vocal resonances and anti-resonances, pitch, estimated glottal flow waveform etc. are included.

General Methodologies for Simulating Voice from Image Data

Figure 6:
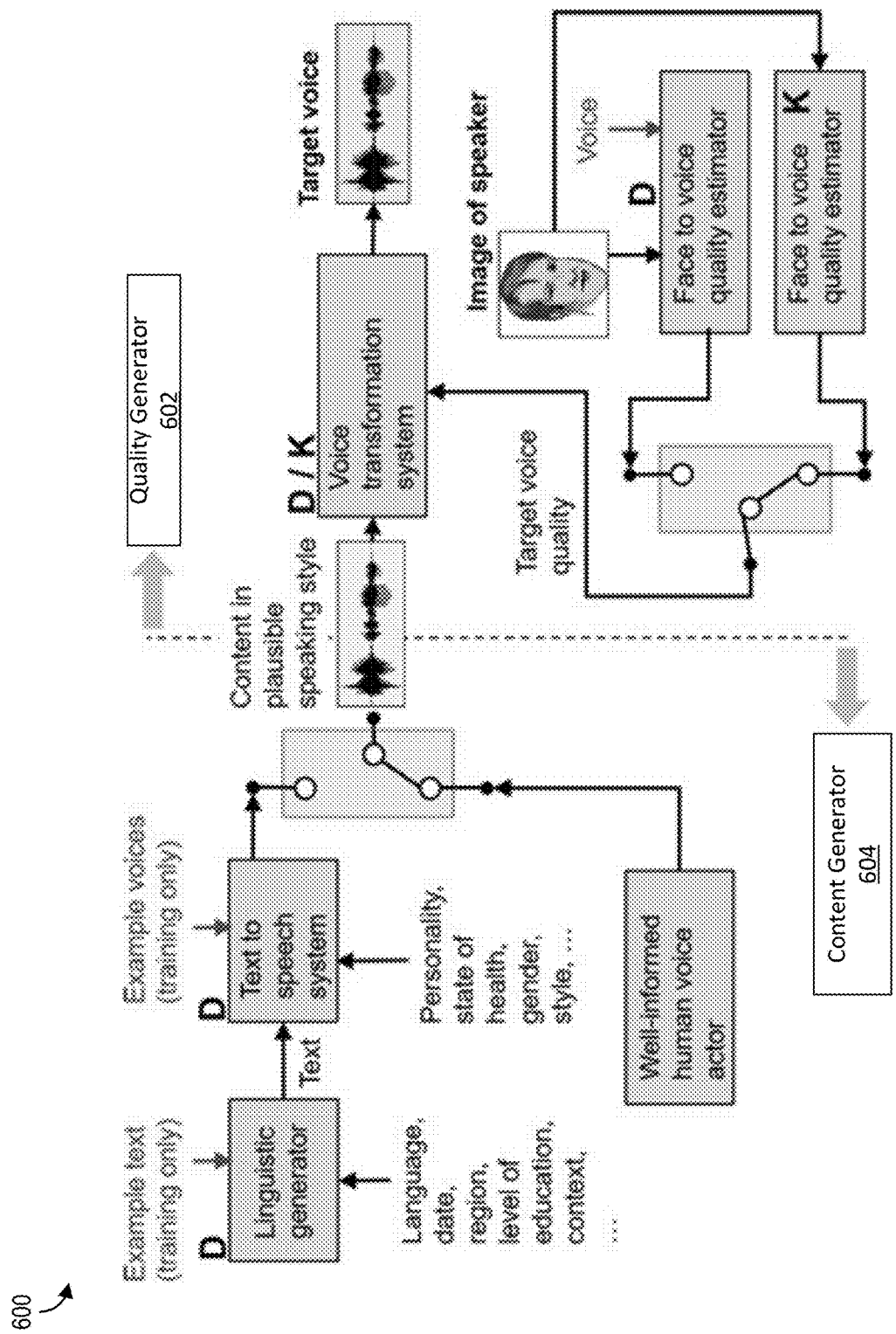
FIG. 6 shows an example of an end-to-end framework for generating a voice signal from image data.

Turning to FIG. 6, a fully automated pipeline 600 for the generation of voice from facial structure (and body where available in its advanced embodiments) includes two components, applied serially, in parallel or in a merged fashion: a content generator 604 and a quality generator 602.

A content generator 604 is a mechanism that, given a 2D or 3D images of a face (or the full body in advanced versions), generates a speech signal in plausible language that is also period-appropriate, origin-appropriate, personality-appropriate, context-appropriate, style-appropriate etc. Generally, for a content generator 604, text is provided for transforming into the speech signal. Automatic generation of meaningful text has also been a subject of extensive research and methodologies exist to generate compositions in text that make sense locally, in a completely automated fashion.

The potential generation of speech that is appropriate in all of the aspects mentioned above (other than pragmatic) is possible, provided there are sufficient data to train the corresponding neural-net based (AI) systems with. If such data are not available, then content generation must be done manually: the appropriate content should be researched and rendered into voice form with as much stylistic and person-fidelity as possible. This signal comprises the input for the second key component of an automated face-to-voice generating system: the quality generator.

The function of the quality generator 602 is to deduce the specific perceptual voice qualities of a speaker, given the image data representing the speaker's face. The quality generator 602 can include an automated system that maps features derived from facial images to estimates of different sub-components of voice quality. Once the voice quality estimates are available, a subsequent mechanism can learn to impart the given voice qualities to the signal generated from the content generator (which could be automated, or be a human, as we discussed). Transforming voice to have a desired set of qualities falls under the aegis of voice transformation. Note that the content generator falls under the aegis of voice synthesis. Voice transformation can be entirely data-driven, or knowledge-based, or a combination of both. In a data-driven approach, a system must learn to transform signals with specified sets of voice quality values to voice signals with a different sets of voice quality values. Essentially, they must learn to transform the voice of one speaker to that of another. The content of the speech must either be the same for both speaker, or, if different more complex training mechanisms must be used (requiring even more data). The availability of large amounts of training data is generally used in these approaches.

A knowledge-based approach to voice transformation involves using traditional signal processing methods to transform the quality of a voice signal. The estimate for each specific voice quality is obtained from the facial image of the speaker. The estimate itself can be obtained using any data-driven regression mechanism, which can be trained using image-voice-quality pairs. In each pair, the voice quality features used are derived from the voice of the speaker corresponding to the face. When such a regressor is used, the input would be face, while the output would be the estimated voice quality values.

In an alternate implementation, an extension to this system could be trained with{face, voice-quality} pairs as input, and audio (or an invertible representation of audio such as a spectrogram) as output. The input voice-quality features are estimated from the face using a mapping that can be learned during training. The system is constrained such that these estimated qualities are transferred to the output audio signal.

Estimation of Voice Quality from Facial Features

Generally, the data processing device 120 uses two ways to approach the problem of voice quality estimation from facial features: a data-intensive one (labeled D in FIG. 6), and the other a knowledge-based one (labeled K in FIG. 6) that exploits known relations between facial features and voice qualities.

The data driven estimator is a regressor (which could be neural network) that is trained using a large number of voice-quality and facial image pairs, where each pair belongs to the same speaker. During training, the system takes in facial images as input, and learns to correctly estimate the corresponding voice qualities as output. Obviously, to derive the voice-qualities for training, each speaker's voice must be available. Hence, although the estimator may not directly use voice as input (this is indicated by the "voice" arrow in FIG. 6), a voice signal is used by the data processing device 120 available to obtain the voice qualities needed for training.

In some implementations, the data processing device 120 uses a knowledge-driven estimator. This estimator also maps facial images to corresponding voice quality features, but unlike its data-driven counterpart, it does not use facial images directly. Appropriate features must be derived from these images and formulaic mappings between these features and voice qualities, devised offline from separately conducted studies, must be used to map the derived facial features to voice quality estimates. The topics of derivation of facial features and that of mapping these to voice quality estimates from a knowledge-based perspective are discussed below.

Deriving Features from Facial Images

The specific features that the data processing device 120 derives from a face to estimate voice quality are generally meaningful or informative in this respect. While the shape and dimensions of the vocal tract are estimated by those of the skull, not all parts of the skull are relevant for this. Those portions of the skull that play a part in deciding the vocal tract anatomy are the ones whose measurements are likely to relate to voice quality.

be processed in a given situation. When 3D scans are available, similarly motivated measurements can be defined and used. 3D scans can yield measurements such as the cephalic index, which includes a scaled ratio of the width of the head to its length.

The features used for profiling in the knowledge-based framework are a combination of the basic facial measurements, and their ratios. Note that such measurements can also be useful in reconstructing the face or skull—the mapping from these to voice quality can be reversed to obtain facial/skull structure from voice quality. The voice quality used in this process can be estimated from the voice signal using data driven or knowledge driven techniques.

Relating Facial Features to Voice Qualities

The relationship between facial features and voice quality can no doubt also be learned in a data driven fashion—however, in some situations we may not have enough data to do so. In such situations, functional relationships must be established between these features and voice quality, such as relationships between various parts of the vocal tract, and properties of the voice signal. These relationships are directly applicable to those facial measurements that are linearly related to the corresponding parts of the vocal tract. They can thus be used to estimate the corresponding voice quality values. Table 1 lists a few examples. For example, tongue volume is correlated to the size of the oral cavity, which is related to skull size and facial dimensions. Tongue volume is also a factor in some voice qualities.

TABLE 9.1

A few illustrative examples of relationships between vocal tract geometry and voice quality

| Vocal tract part | Related skull part | Voice quality |
| --- | --- | --- |
| Lip opening size, size of oral cavity. | Mandible and upper jaw. | Twangy voice quality is associated with shortened tract length, widened lip opening, and a slightly constricted oral cavity. A yawny voice quality is associated with the opposite of these. |
| Lower jaw, lower half of oral cavity, tongue size, lower teeth. | Mandible. | Vowel qualities, resonance. |
| Size of pharynx. | Distance between Nasion and Gnathion (see FIG. 9). Top of the nasal bone to the lower tip of the mandible and length of neck. | Pitch; voice qualities dependent of formant positions, such as resonant, ringing etc. |
| Position of larynx relative to size of pharynx. | Same as above. | Raised larynx voice qualities, or lowered larynx voice qualities (coveredness, yawniness etc.). |

Figure 7:
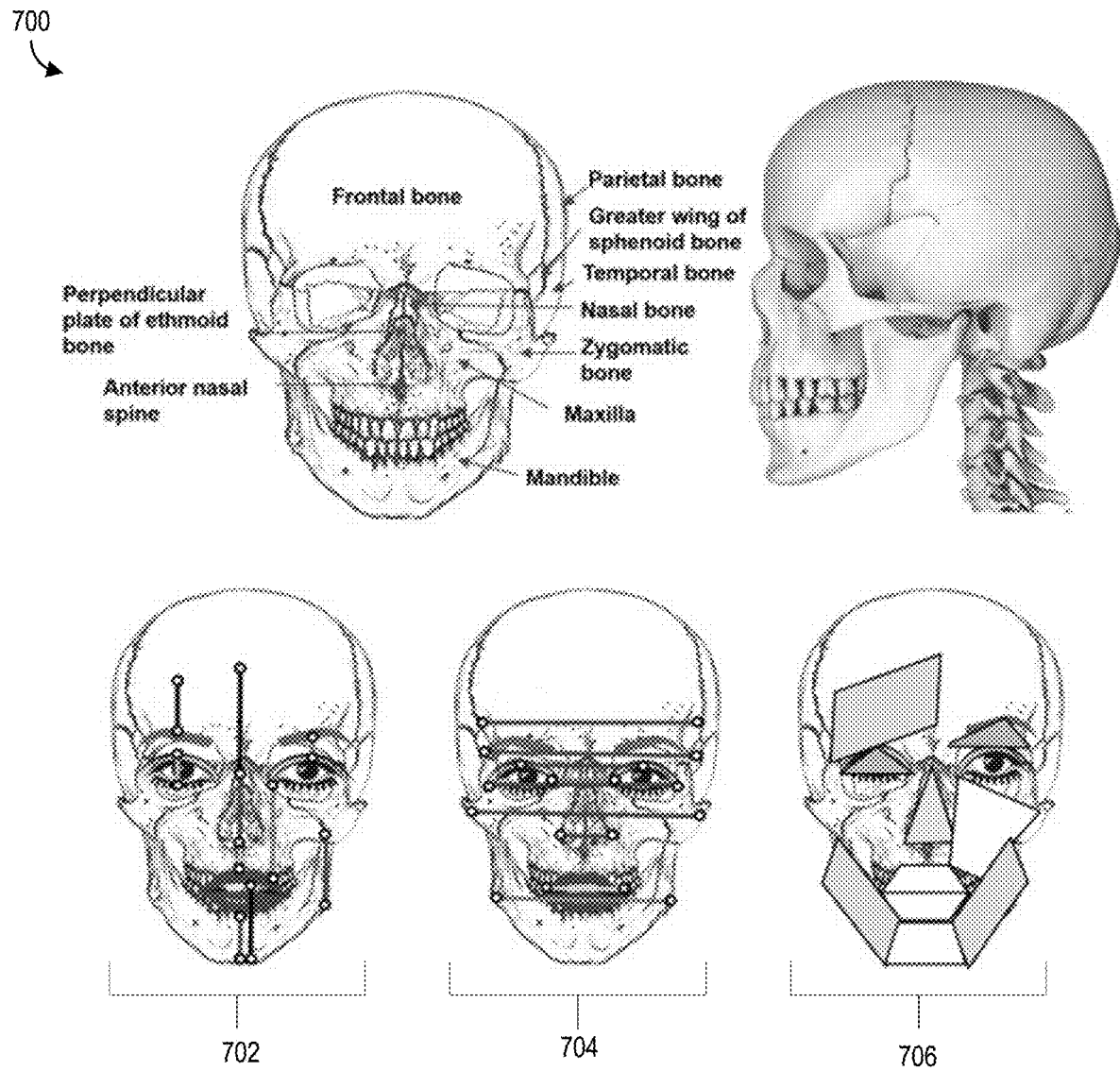
FIG. 7 shows example measurements of a human skull for use in generating a voice signal from image data or generating image data from a voice signal.

FIG. 7 shows the anatomy of a human skull 700, focusing on the major bones only. The bones on the upper part of the skull have little to do in shaping the vocal tract, but they do give an indication of the shape and dimensions of the rest of the skull, including those that comprise the articulators and define the shape and dimensions of the vocal chambers (oral, nasal and nasopharyngeal) of the skull.

The most meaningful facial features for voice generation are the measurements of different relevant parts of the face shown by example anatomies 702, 704, and 706, which shows some meaningful direct measurements in the horizontal and vertical directions, and of area over some relevant bones, respectively. These can be obtained using one of many available automated facial landmark detection algorithms or even measured manually if only a few faces must Relationships that have not already been measured can be estimated (at least roughly) from a few examples of face-voice pairs. The simplest way to estimate these is to chart the variation of each voice quality feature with each kind of facial measurement, and fit a function to the graph. Given a new face, ensembles of such functions can be used to estimate each voice quality. For voice transformation, the mechanism used could either be data-driven, or knowledge based. In a knowledge-based mechanism, signal processing methods are used to impose the desired characteristics of the source voice signal on the target voice signal. We will not discuss these methods here.

In a data-driven mechanism, pairs of voice signals—from the source and target speaker—are used to train the system.

The goal is to transform the source signal to have the style and quality of the target signal, while retaining the content of the source signal.

Figure 8A:
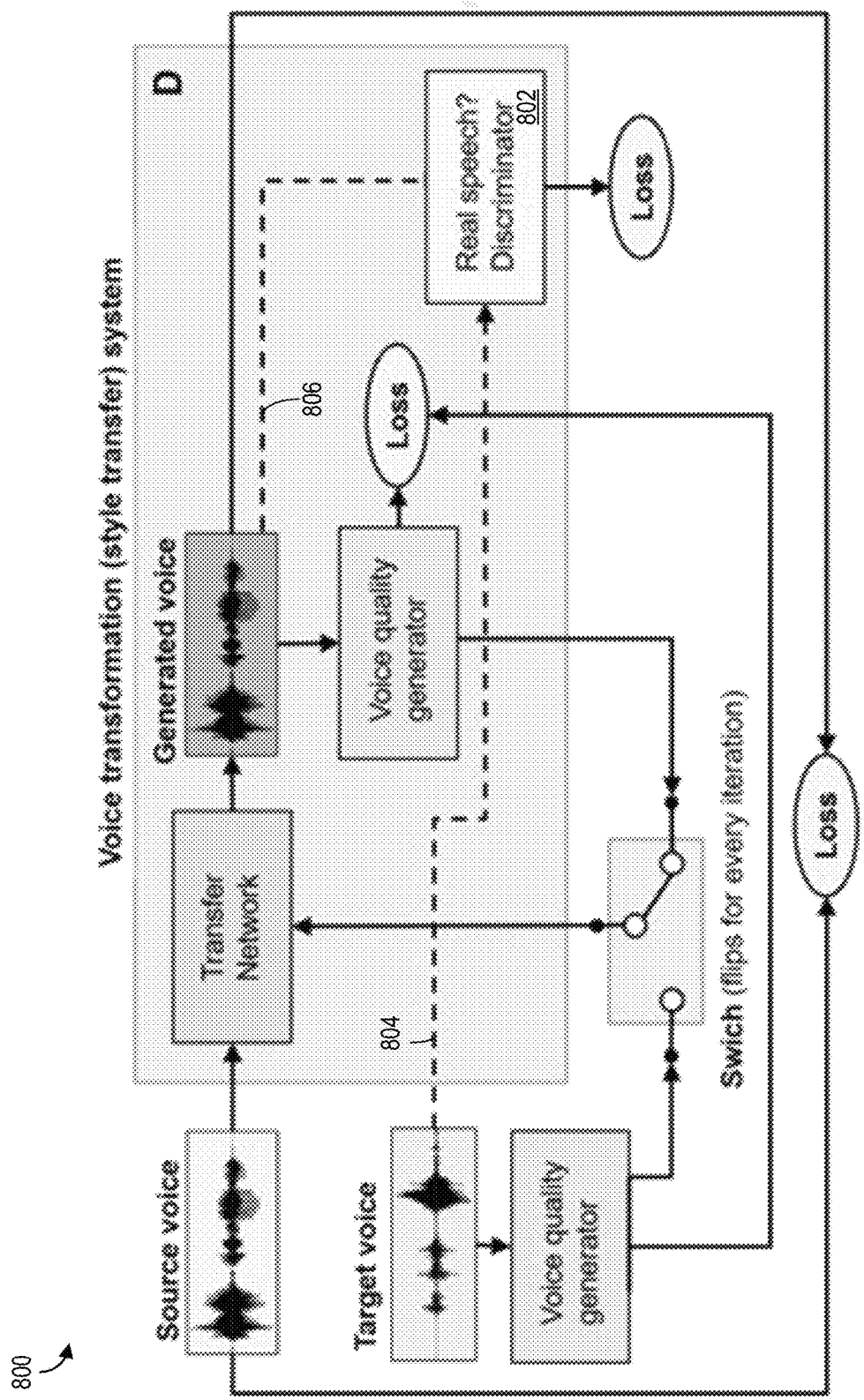
FIGS. 8A, 8B, and 8C show example system architectures for cross-modal reconstruction of representations of a speaker's face from voice signals and a simulated voice signal from image data representing the speaker's face.

One method to achieve this goal is shown in FIG. 8A. The process 800 shown in FIG. 8A transfers the voice quality of the target signal to the source signal, resulting in a generated signal that has the content of the source signal and the voice qualities of the target signal. To achieve this, the training of the transfer network is conditioned on the voice quality features derived from the target signal (these features are computed at the beginning of the training iterations, and fixed). The training, as always in such case, is an iterative process. The parameters of the model shown are updated in each iteration, based on three objectives. The first objective is that a loss that compares "real" speech from the target speaker to the "synthetic" speech generated by the transfer network in that iteration. This is the discriminator loss. The output of the discriminator is ideally 1 for real speech and 0 for generated speech. The second objective is to determine a loss that compares the "distance" (e.g. an $L^2$ norm) between the input and generated speech. This includes the reconstruction loss. The third objective is to determine a loss that computes the distance or difference (e.g. an L1 norm) between voice quality vectors of the target and generated voices. This includes the quality loss.

These terms are referred to as discriminator loss (DL), reconstruction loss (RL), and quality loss (QL), respectively. DL is necessary because in its absence, the spectrum of the generated signal could potentially be changed in arbitrary ways (e.g. by smearing the source spectrum somewhat), and the process could still be brought to convergence at a local optimum where RL and QL are minimum. However, the generated speech may not even sound like speech, let alone retain the content of the source with high fidelity. DL is a binary (yes/no; 0/1) decision by the discriminator that evaluates the "realness" of the generated signal in a perceptual sense. RL ensures that the generated signal is the same as the input signal if nothing changes, i.e., the transfer process has minimum content loss. QL ensures that the generated signal has the voice qualities of the target signal. The presence of DL renders this process a Generative Adversarial Network (GAN) based one, as described previously in relation to FIG. 4. The transfer network generates a signal that sounds like the "real" speech. The goal is to "fool" the discriminator into deciding that the synthetic speech is in fact "real." It does so by adjusting the network parameters in each iteration so that RL and QL are minimized, while DL is maximized. The purpose is to discriminate between the two signals in a perceptual sense, such as to recognize the fact that the generated signal is indeed synthetic. The data processing device 120, by executing the discriminator 802, learns to do so by learning to maximize its output in response to the real speech, while minimizing DL (to 0) in response to synthetic speech. Dashed lines 804, 806 are used for the GAN component, while regular error minimization is indicated by solid lines.

The training is an iterative two-step process. Within each iteration, in the first step the transfer network is optimized to minimize RL and QL and maximize DL. In the second, the discriminator is optimized to minimize DL for synthetic speech and maximize it for real speech. In practice, DL could be removed if the training starts from very accurate estimators for voice quality and closeness of reconstruction. GAN setups are more complex and slower to train. The discriminator can also be made generic in practice, designed only to decide whether the generated signal is human speech or not.

Note that in this setup, there is no attempt to directly minimize the differences between the generated and target signal. They are disconnected. This renders the framework independent of content of the source and target signals, ensuring that only the desired voice qualities are transferred from the target signal to the source signal.

Process for Face to Voice Generation

It is very easy to now see that the same setup can be used to transfer the style of speaking (and other mannerisms) of the target to the source signal as well. Such frameworks are in fact called style-transfer frameworks, and in principle can be used to transfer the style of any pairs within the same modality, e.g. style of photographs to paintings, an image of a face to an image of another face etc. Style transfer frameworks can in fact be used in a wide variety of applications.

Figure 8B:
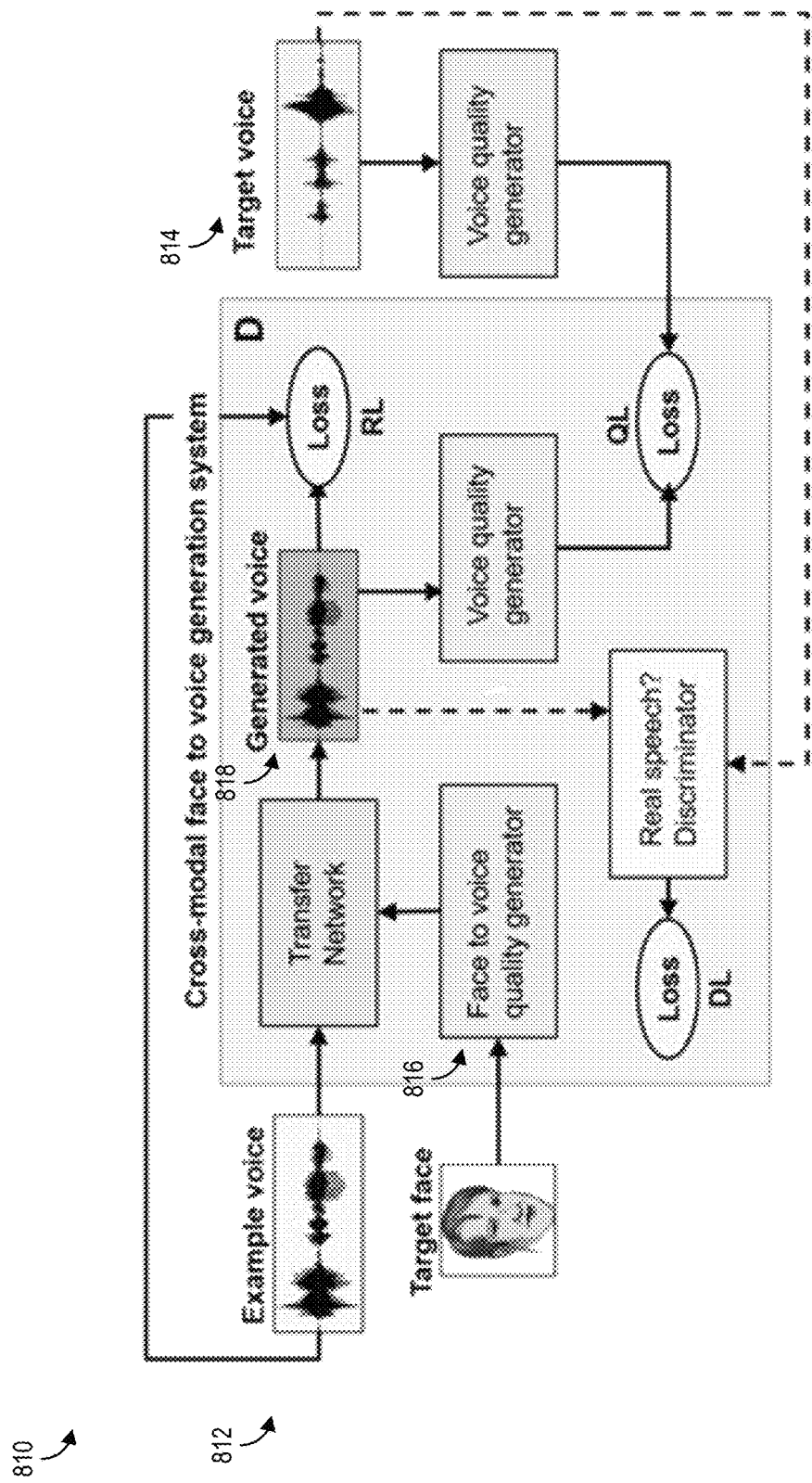

This voice transformation network 810 can be extended to create a complete face to voice generation system, as shown in FIG. 8B. Since this system effectively transforms one modality into another (image to audio), this is an example of a cross-modal transfer system. FIG. 8B shows how such a system is trained. A database of face-voice pairs (called the "target face" and "target voice" in the figure) is used to train the system. The goal is to learn, given the target face, to generate a signal that has the qualities of the target voice. An example voice 812 (with the desired linguistic and other content) is used as input, and the system is trained to transfer the target voice 814 qualities to it, while retaining its content. Much of this framework is similar in principle to that of the voice transformation (or style transfer) system discussed above, except for that fact that the voice qualities imparted to the example voice must be those that are deduced from the target face. They must, ideally, also be the same as the voice qualities of the target voice. To this end, a face-to-voice-quality generator 816 is used in the manner shown in the figure. The generated signal 818 is transformed to have the voice qualities output by this generator. QL in this case ensures that the imparted qualities are the same (or close to) those that can be directly extracted from the target voice 814.

Note that since generally all components of these systems are neural networks, the training process involves updating the system parameters through standard back-propagation of the losses. As explained above, a system that transforms face to voice is a cross-modal transfer system. The architecture 810 of this system can be effectively used for voice to face generation, with minimal changes. The underlying principles of course remain the same as for any generic cross modal information transfer.

For face to voice generation, the use of voice quality features is motivated by the fact that they are meaningful in a profiling context, and through associations that can be formed from prior studies, they are also directly relatable to facial measurements. If this were not the case, any encoding into a latent representation would suffice instead of the voice quality estimator, provided it were meaningful in some manner.

Another Process for Voice to Face Generation

As previously explained, a system that transforms face to voice is a cross-modal transfer system. The architecture of this system can be effectively used for voice to face generation, with minimal changes. The underlying principles of course remain the same as for any generic cross modal information transfer.

Figure 8C:
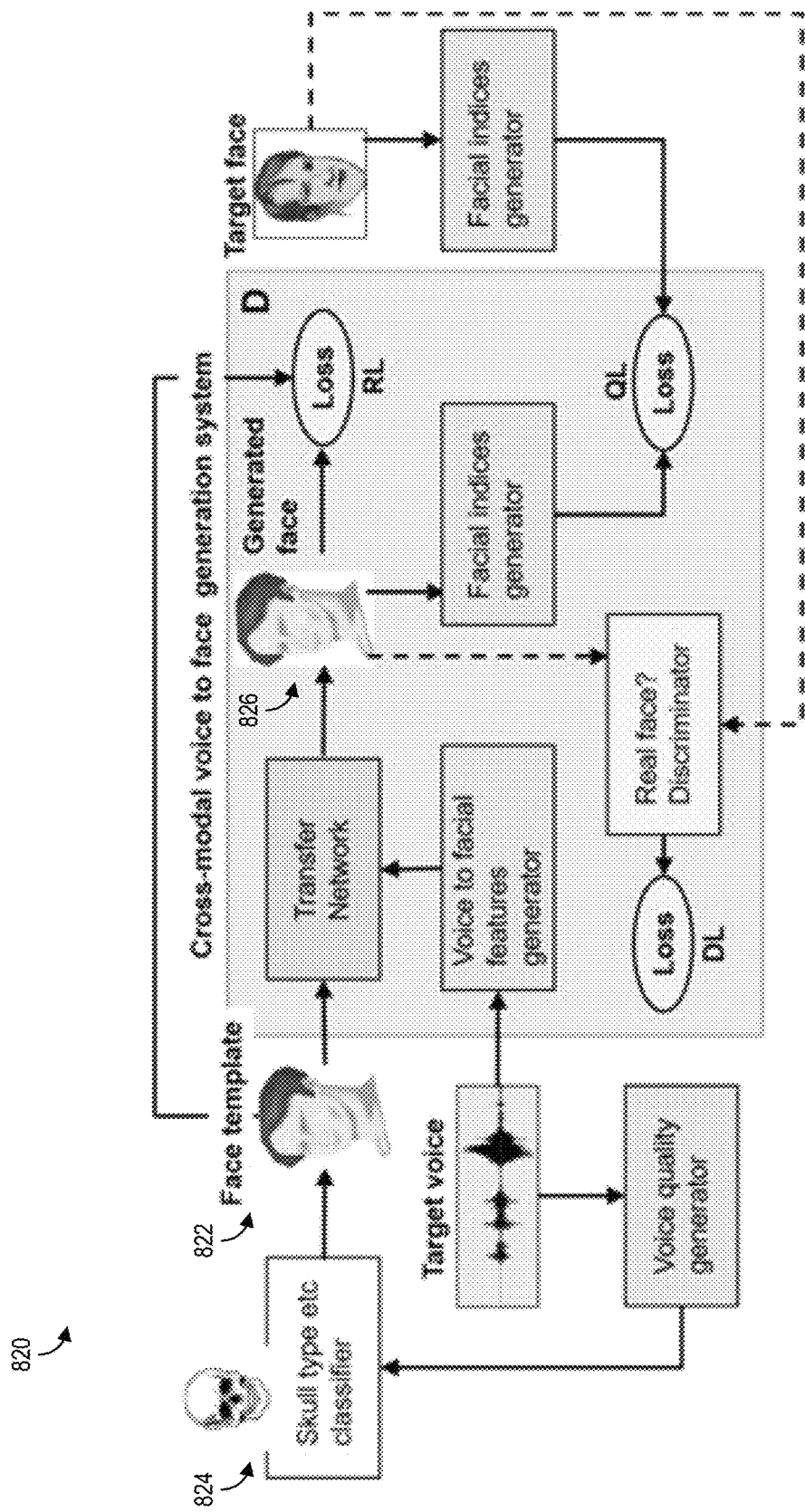

FIG. 8C shows a system architecture 820 that reconstructs face from voice may be set up and trained. The architecture 820 is the same as in the face to voice generation system, except now the modalities are switched. Instead of an example voice, now an example face must be provided as input, on which the characteristics of the face estimated from a given voice signal must be algorithmically imposed.

The system 820 in FIG. 8C can be trained using target voice-face pairs. A template face 822 is first estimated from voice in a procedure that first estimates the skull structure from voice. A pre-trained skull-type classifier 824 may be used for this. A template face 822 is then estimated on the basis of skull type and other profile parameters, such as gender, ethnicity etc. This comprises the example face. Facial features (such as landmarks) estimated from the target voice influence the transfer network to generate a representation of a face 826 which is essentially a transformed version of the template face. DL, QL and RL evaluate the realness of this generated face, its closeness to the target face in terms of facial features, and it closeness to the template face. When trained, the parameters of the system are fixed. During operational use, this system takes in a voice signal as input, and generates a face as output.

Generating Body Types

The skeleton largely determines the stature and relative proportions of the torso and limbs. The body shape and external appearance are strongly influenced by many factors such as gender, age, weight etc. There are of course many others that can play significant but incidental roles, such as state of health, presence of disabilities, habits, environment, exercise levels, profession, nutrition etc. All of these factors are collectively decisive of body structure. As a result, estimates of body structure must be jointly conditioned on them, with further refinements conditioned on available knowledge of incidental factors (which may also be derived through profiling).

To reconstruct the body from voice, the data processing device 120 exploits the more direct relations between the skull structure and voice. The data processing device 120 estimates a skull type and dimensions, and facial morphology from voice. Known relationships between the skull and the body morphology, augmented by relevant profile parameters that relate to body structure, such as age, height, weight etc. are then used by the data processing device 120 to estimate the full body structure. These two steps can be cast into computational mechanisms for the automatic reconstruction of the human profile from voice.

Estimating Skull Dimensions and Facial Morphology from Voice

Facial morphology can be estimated once the skull type and dimensions are specified, as shown in FIG. 8C. For computational profiling purposes, estimation of broad categories of skull, and relating those to face types is sufficient in most cases. The finer details of the face can be further learned through appropriate data-driven AI algorithms. Some broad-level categorizations of the skull and face are described below.

In classical anthropometry, human skulls are categorized into three types: brachy-cephalic, mesocephalic and dolichocephalic. This categorization is based on the cranial index. Similarly, facial morphology is divided into three types: euryprosopic, mesoprosopic and leptoprosopic, based on the facial index.

However, variations among these exist. Other categorizations that relate skull type to facial type classify faces as brachyfacial, mesofacial and dolichofacial, following the skull-type classification. Implicitly, these use the cranial index rather than the facial index. Some studies use four categories of facial types, two of which are defined in terms of anterior-posterior measurements, and two in terms of vertical measurements of the skull/face. Many others exist in different contexts such as evolutionary biology, forensic anthropology, orthodontics etc.

Cranial and Facial Indices

Figure 9:
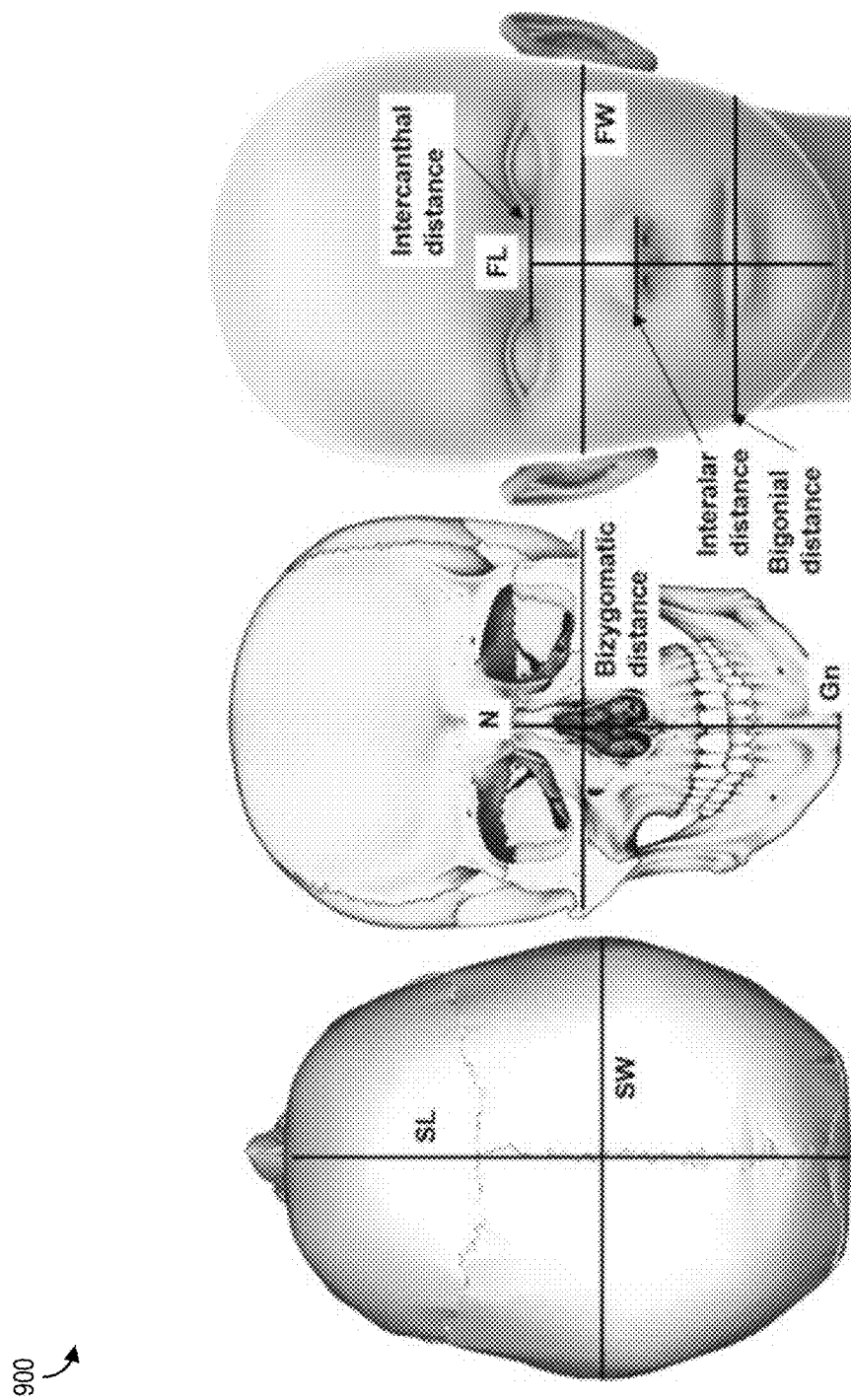
FIG. 9 shows example measurements of the skull used for calculations of facial and cranial indices.

FIG. 9 shows the measurements used for defining the cranial and facial indices. The cranial index (CI) is defined in terms of the maximum skull width (SW) and the maximum skull length (SL) as CI 100 (SW/SL). In living individuals, when measured from the top of the head, the same ratio is called Cephalic Index. The Facial index (FI) of the skull is defined as the product of facial height (FH), measured from the Nasion (N) (midpoint of nasofrontal suture on the root of the nose) to Gnathion (Gn) (midpoint on the lower border of the mandible) anatomical landmarks, divided by the bizygomatic width (connecting the most lateral points of the zygomatic bone) (FW), measured from the right to the left Zygion. FI 100 (FH/FW). On a face, the corresponding measurements are the face height and width.

Tables 2 and 3 show the categorizations of skulls and faces into different types based on these indices.

TABLE 2

Head classification based on cephalic index.

| Type | Cephalic index range |
| --- | --- |
| Ultradolichocephalic | –64.9 |
| Hyperdolichocephalic | 65.0-69.9 |
| Dolichocephalic | 70.0-74.9 |
| Mesocephalic | 75.0-79.9 |
| Brachycephalic | 80.0-84.9 |
| Hyperbrachycephalic | 85.0-89.9 |
| Ultrabrachycephalic | 90.0- |

TABLE 9.3

Face classification based on facial index.

| Type | Cephalic index range |
| --- | --- |
| Hyperuryprosopic | –79.9 |
| Euryprosopic | 80.0-84.9 |
| Mesoprosopic | 85.0-89.9 |
| Leptoprosopic | 90.0-94.9 |
| Hyperleptoprosopic | 95.0- |

Figure 10A:
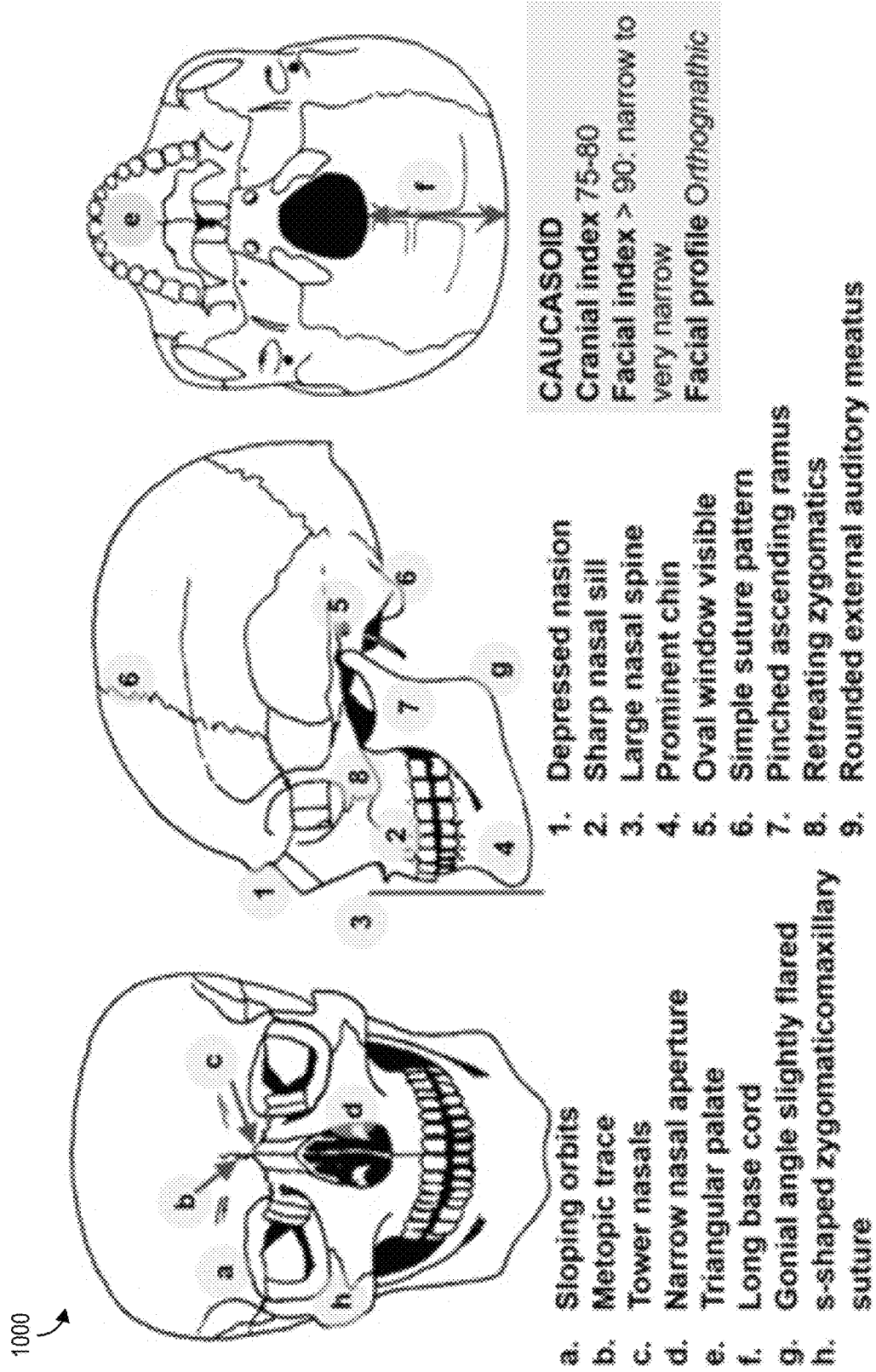
FIGS. 10A, 10B, and 10C each show example features of skull types.
Figure 10B:
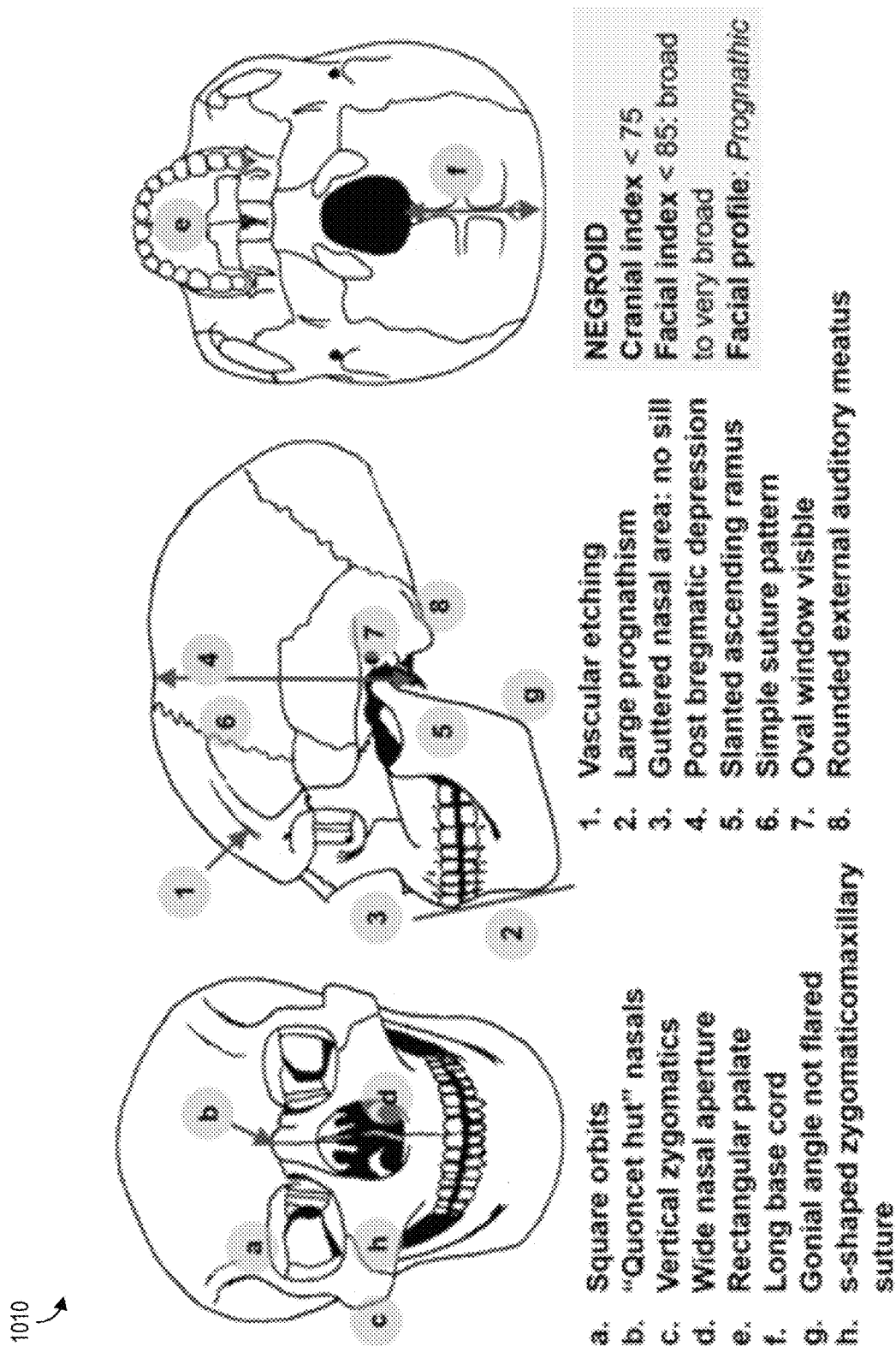
Figure 10C:
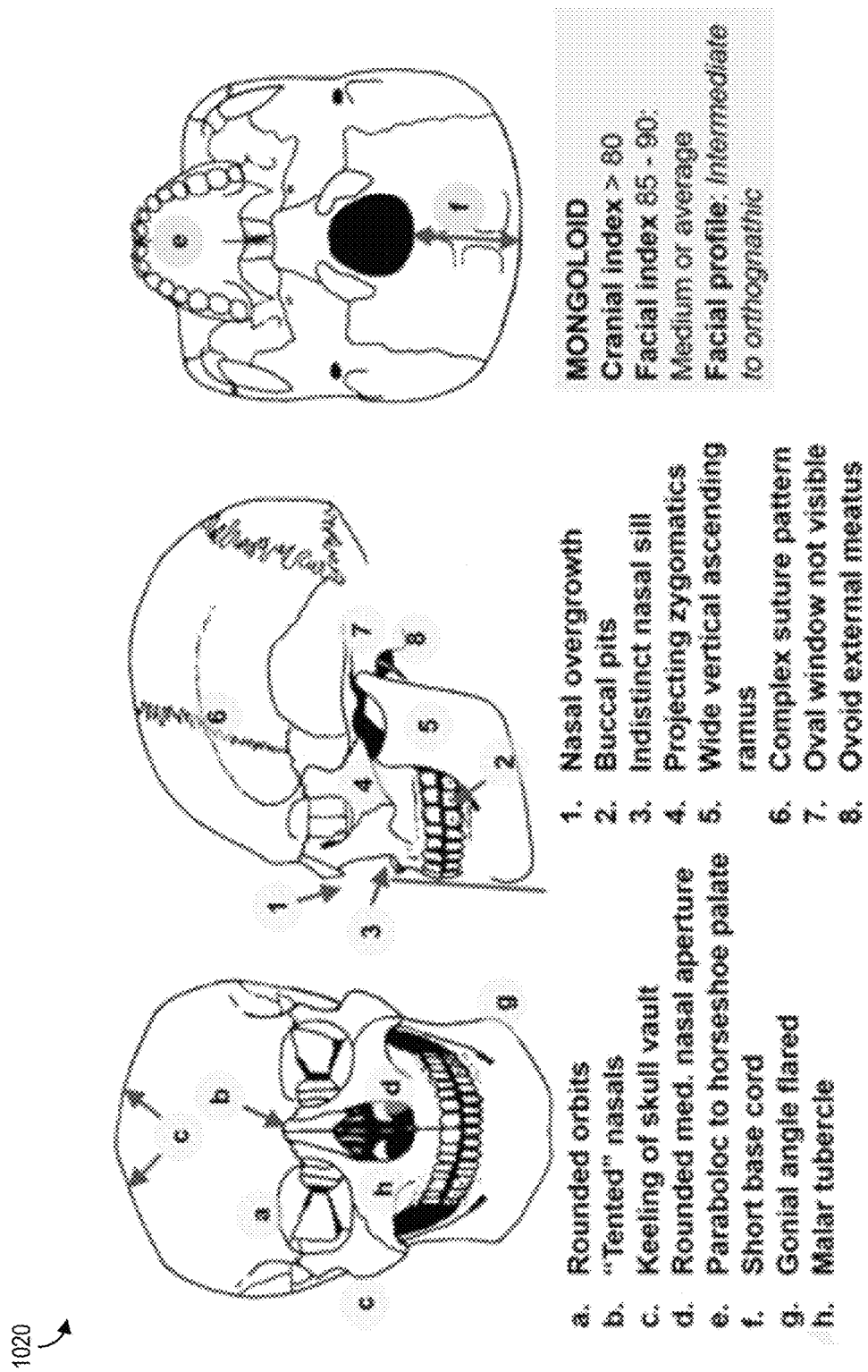

Based on overall proportions of the skull and physical structure, human population is divided into three categories: Caucasoid, Mongoloid and Negroid. FIG. 10A shows an example 1000 of Caucasiod features, FIG. 10B shows an example 1010 of Mongoloid features, and FIG. 10C shows an example 1020 of Negroid features. Each skull type is on average distinguishable from the others through the proportions, angles and prominence of various bones, shown by alphabetically and numerically labeled features for each of FIGS. 10A, 10B, and 10C. Within each of these basic skull-types across the human population, there are epigenetic variations, often caused by variations of genetically determined but environmentally shaped growth patterns of tissues, muscles, nerves etc. on bone growth. The specific characteristics that vary include facial cavities, sutures (shape, persistence), sutural and fontanelle ossicles, spines, tubercles, tori, notches, depressions, grooves, osseous bridges, foramina, canals and their finer structures. Many of these differences affect the size and shape of vocal chambers.

Estimating the Body Structure from the Skull/Face

The goal of full body reconstruction is to estimate the complete form factor (or morphology) of the body accurately. To do this, the first step for the data processing device 120 is to estimate the skeletal proportions from the estimated skull/facial morphology, aided by other profile parameter estimates. These estimates are based on known relationships between specific measurements of the body/skeleton to measurements of the skull/face. The most appropriate measurements for this purpose are those based on anthropometric guidelines. Anthropometry is the science of measuring the human body.

The skull size is generally highly correlated with skeletal size. The skull proportions have a weaker but positive correlation with skeletal proportions. Skeletal proportions however do not alone account for body shape, which depends on many other factors, including gender, age, body mass index (BMI), fat and weight distribution, musculature, health conditions etc.

Figure 11:
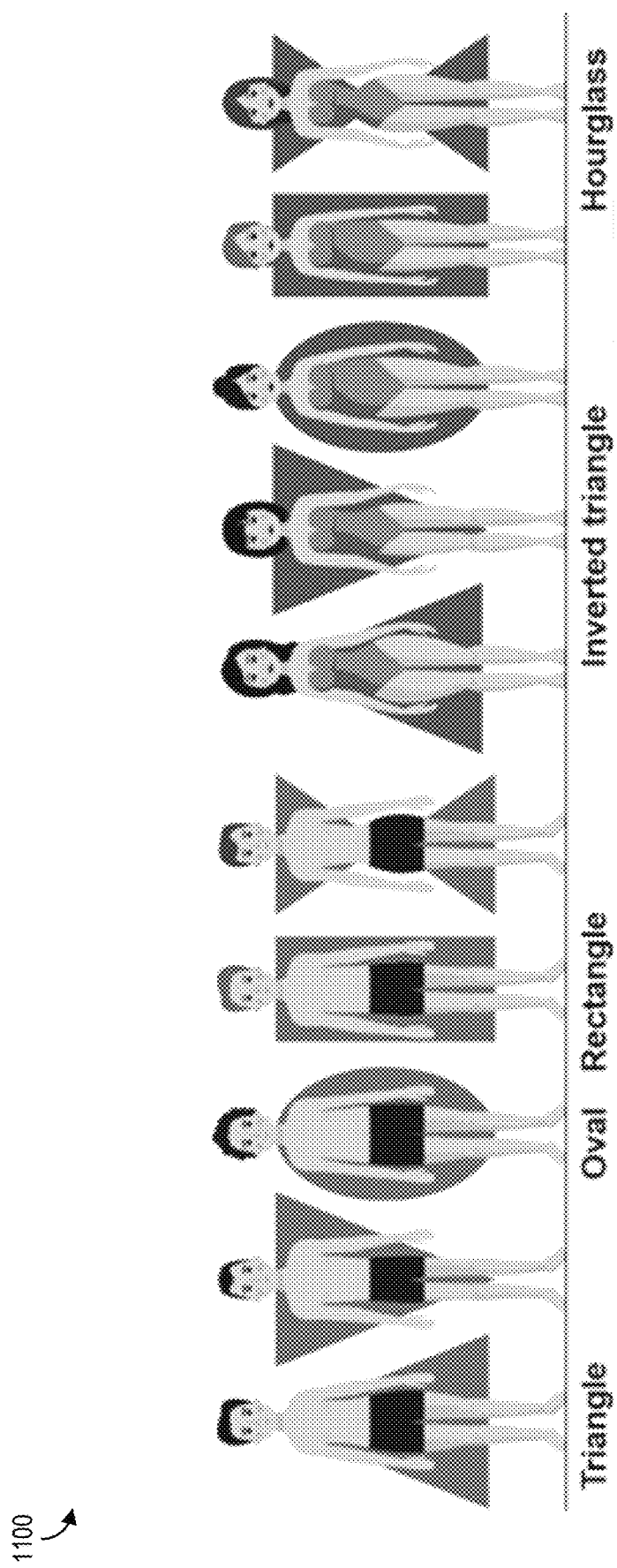
FIG. 11 shows examples of human body shapes that are estimated by the data processing device.

Body shapes are of five kinds as shown in FIG. 11. The body types 1100 shown in FIG. 11 include a pear (or triangle) type, an inverted triangle type, an apple (or round) type, a rectangle type, and an hourglass type.

Body Measurements

As in the case of the skull and face, anthropologists use specific measurements of the body to describe the full body morphology of a human. Anthropometric traits of the body are gauged in terms of body indices. As in the case of Cephalic and facial indices, these are usually defined in terms of subsets of body measurements. Body measurements for such studies are based on anthropometric points 1300, which are labeled in FIG. 13. As an example of how these are selected for different studies, the list in Table 4 shows a subset used in a specific study about the genetics of human body size and shape. Body indices are usually specifically designed for different studies, but for profiling, they may be selected from widely used standard sets.

TABLE 9.4

List of body measurements: a study example

Figure 12:
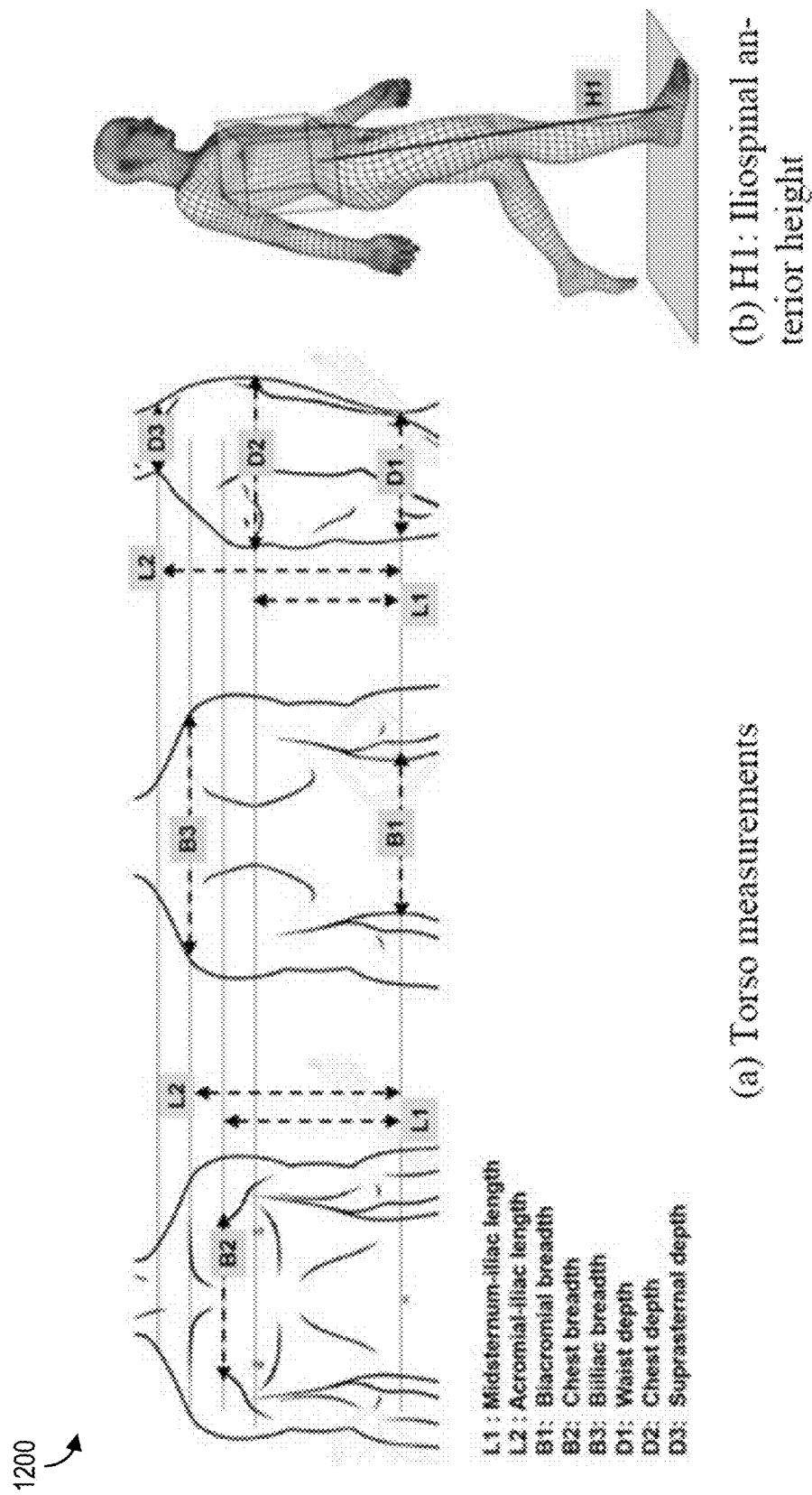
FIG. 12 shows examples of measurements for determining example body indices.

| Measurement type | What is measured (Description) |
| --- | --- |
| Body length | Total body length, stature, suprasternal, acromial, dactylion, iliospinal anterior (shown in FIG. 12), symphysion, tibial, and sphyrion tibial |
| Extremities length | Thigh, tibial, foot |
| Extremities breadth | Knee, ankle, foot |
| Limb lengths | Upper arm, forearm, hand |
| Limb breadths | Hand, wrist |
| Body trunk breadths | Biacromial, biiliac, chest |
| Body trunk depth | Chest |
| Body trunk length | Trunk |

Body indices may be defined to measure both 2D and 3D geometrical form and proportions of the human body. As mentioned above, these tend to be subjectively defined for different studies.

The index of torso volume ($I_{TV}$) is based on a measure of the volume of a cylinder that encloses the torso. The specific body measurements involved in its calculation are as labeled in FIG. 12 as (a) torso measurements. $I_{TV}$ is calculated by dividing it into subcomponents—thoracic volume ($V_1$) and abdominal pelvic volume ($V_2$). Both $V_1$ and $V_2$ are calculated using a triple integral to describe the specific torso contour involved. $I_{TV}$ by is then given by:

$$V_1 = \frac{\pi}{6} L_1 (2(B_2 - B_1)(D_2 - D_1)) + \qquad (4)$$
$$3(B_2 - B_1)D_1 + 3(D_2 - D_1)B_1 + 6B_1 D_1)$$

$$V_2 = \frac{\pi}{6}(L_2 - L_1)(2(B_3 - B_2)(D_3 - D_2)) + \qquad (5)$$
$$3(B_3 - B_2)D_2 + 3(D_3 - D_2)B_2 + 6B_2 D_2)$$

$$I_{TV} = V_1 + V_2 \qquad (6)$$

A vector of subjectively defined indices can be used as a feature vector in the process of full body reconstruction. If 3D reconstruction and motion is desired, 3D and other kinds of measurements must be used. For rendering motion, for example, the study above defines an equilibrium index based on angles measured with respect to the line that defines the Iliospinal anterior height (shown in FIG. 12, part (b)). Such indices can be very useful in determining static body pose (given a form factor for the body) as well.

Another important variable that plays a significant role in defining the body form is the body mass index, or BMI, measured in kg/m$^2$ as BM I=w/h$^2$, where w is the weight in kilograms, and h is the height in meters; or BMI=703 w/h$^2$ if the weight and height are measured in pounds an inches. The units are usually omitted while reporting BMI measurements, but understood to be kg/m2 universally. According to current guidelines, a BMI between 18.5 and 25 kg/m$^2$ is considered to be optimal weight for a healthy individual. A person is underweight if BMI is less 813 than 18.5, overweight if it is between 25 and 30, and obese when it is greater than 30. 814 Note that people with high muscle to fat ratio tend to have higher BMIs which may sometimes be misleading (as in the case of professional athletes). In reconstructing the human form, an estimate of BMI (from estimated height and weight of the speaker) may help in determining the general leanness or fatness of the body form.

Cues for the estimation of body measurements from the skull/face can be drawn from many fields such as anatomy, biological anthropology. The field of forensic anthropology is perhaps the richest in information needed to estimate the body skeletal structure from facial structure, and for its reverse—facial reconstruction from skeletal parts, including skull parts. Other fields also provide valuable information in this regard, e.g. genetics, or the study of human neoteny.

Skull-type classification is an important first step in this direction. Skull proportions (as given by the cephalic index and other measurements) are different for different skull types, and variants of skull types within populations. The simplest computational method to estimate the body structure is to determine a general shape for the skull (a template skull, or an average skull) given an estimate of the skull type, obtained using a skull-type classifier. Such a classifier is simple to train using any available standard machine learning algorithm that can learn to map features (typically voice quality features) derived from voice to skull type. For this, it must be trained on voice-skull type labeled pairs.

The proportions of the template skull can then be used to estimate the proportions of the body skeleton. For this estimate to be accurate, the co-dependence of these proportions on the age, gender, height, weight, ethnicity and such other relevant profile parameters must be taken into account. If the estimates are probabilistic, they must be conditioned on these co-factors that influence skeletal proportions.

Figure 13:
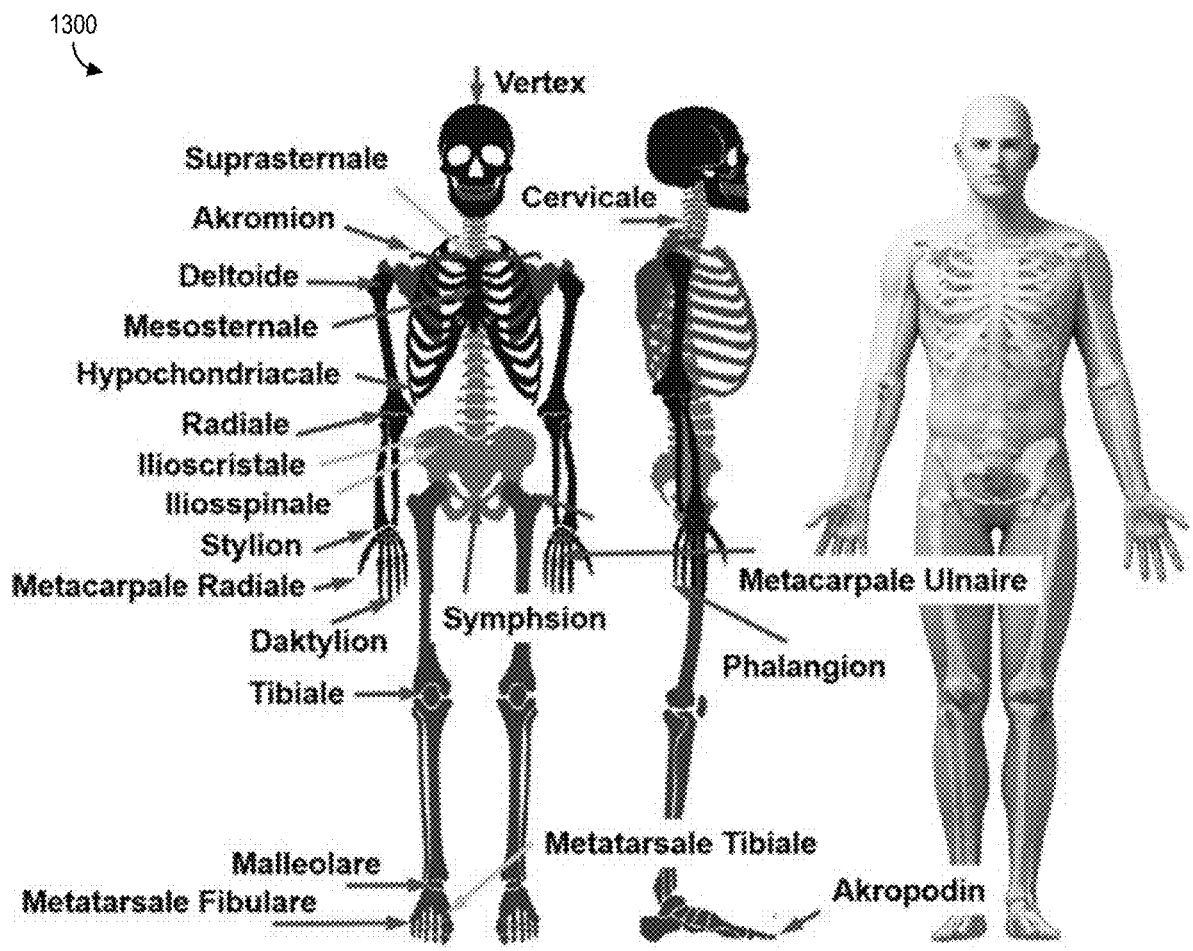
FIG. 13 shows examples of anthropometric points for the human body, which are used to generate a representation of the body from a voice signal.
Figure 14:
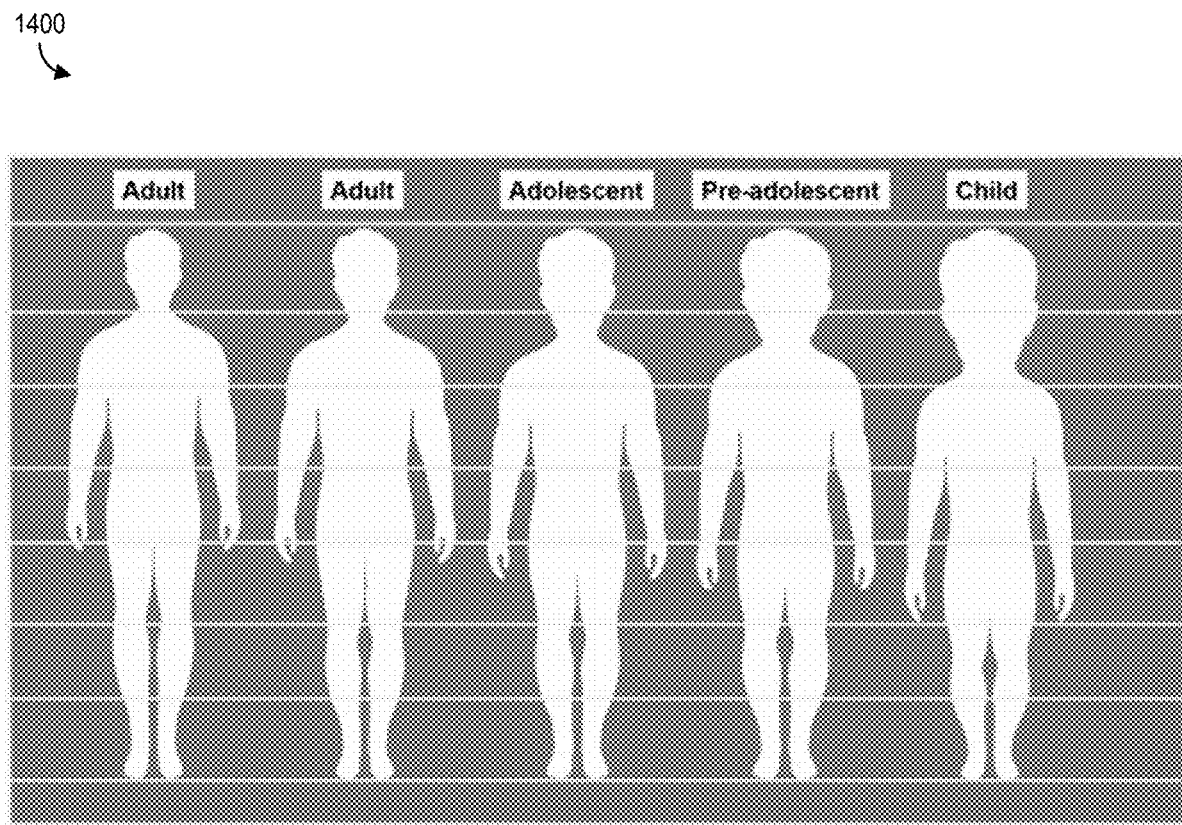
FIG. 14 shows examples of variations of body proportions for different ages of humans.

FIG. 14 shows the dependence of body/skeletal proportions on one such co-factor, called Neoteny. FIG. 14 shows how the proportions of the face (and by extension the skull) relate to the dimensions of the vocal chambers, in forms 1500. FIG. 13 shows the measurements of the body that matter for such estimation. This section only provides a few of examples to illustrate the conceptual methodology, but other examples for measuring proportions are readily available.

Once the full body proportions are determined, they can be refined. Some factors such as the weight distribution across the body can be carefully reconsidered, in the light of other profile information. The proportions of the body are determined in part by the skeleton, but its shape and appearance (the persona) is also determined by muscle and tissue structure, which varies across different skeletal types.

Algorithmic Process for Body Reconstruction from Voice

Estimation of the full body structure from voice can be achieved by the data processing device 120 through a chaining mechanism, where the face is first reconstructed from voice as explained previously, and its characteristics are used to form an initial estimate, of the body of the speaker. As before, other profile information, such as age, gender etc. of the speaker (concurrently derived from voice), may be used to guide this process.

Figure 15A:
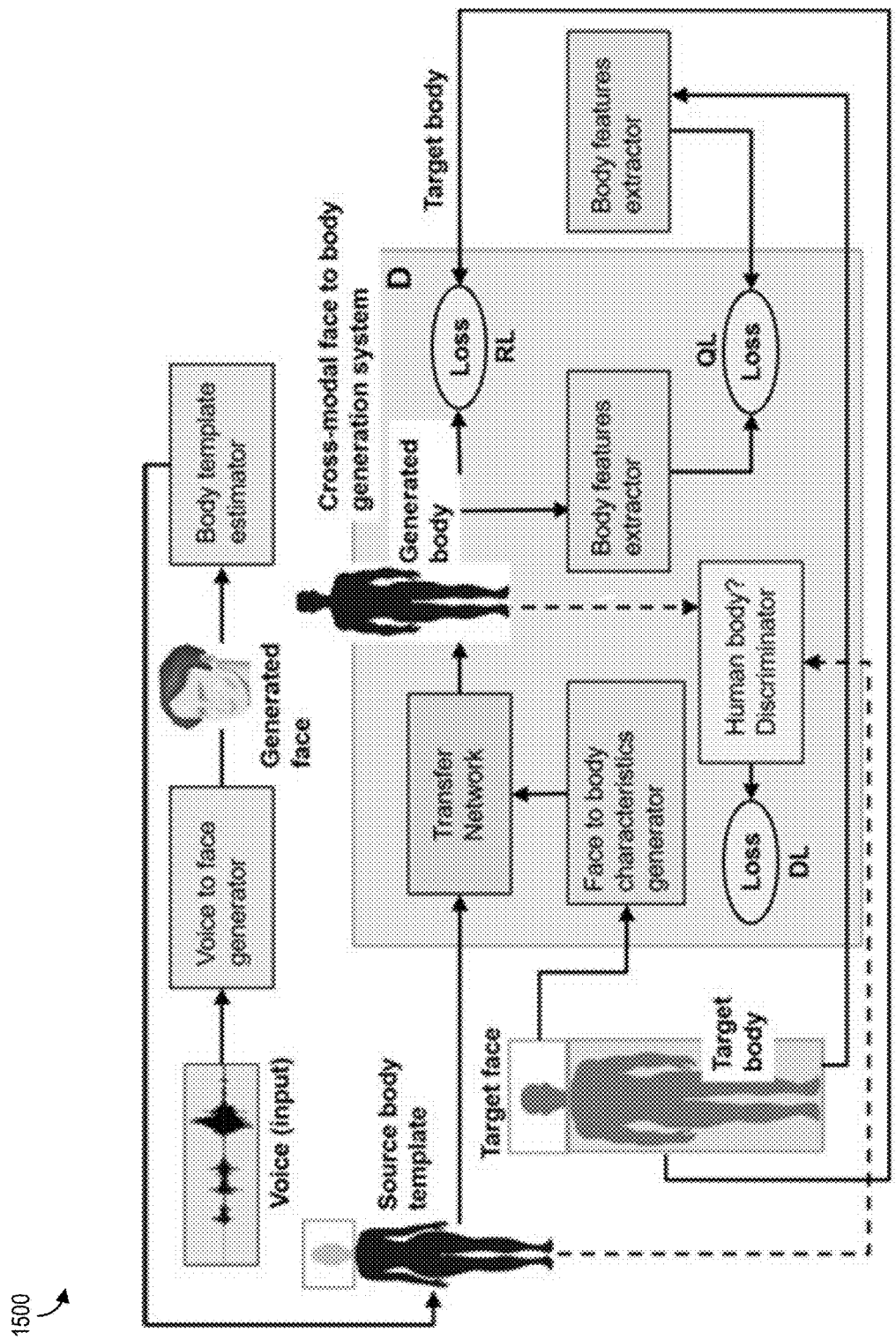
FIG. 15A shows an example of body morphology transfer network training.
Figure 15B:
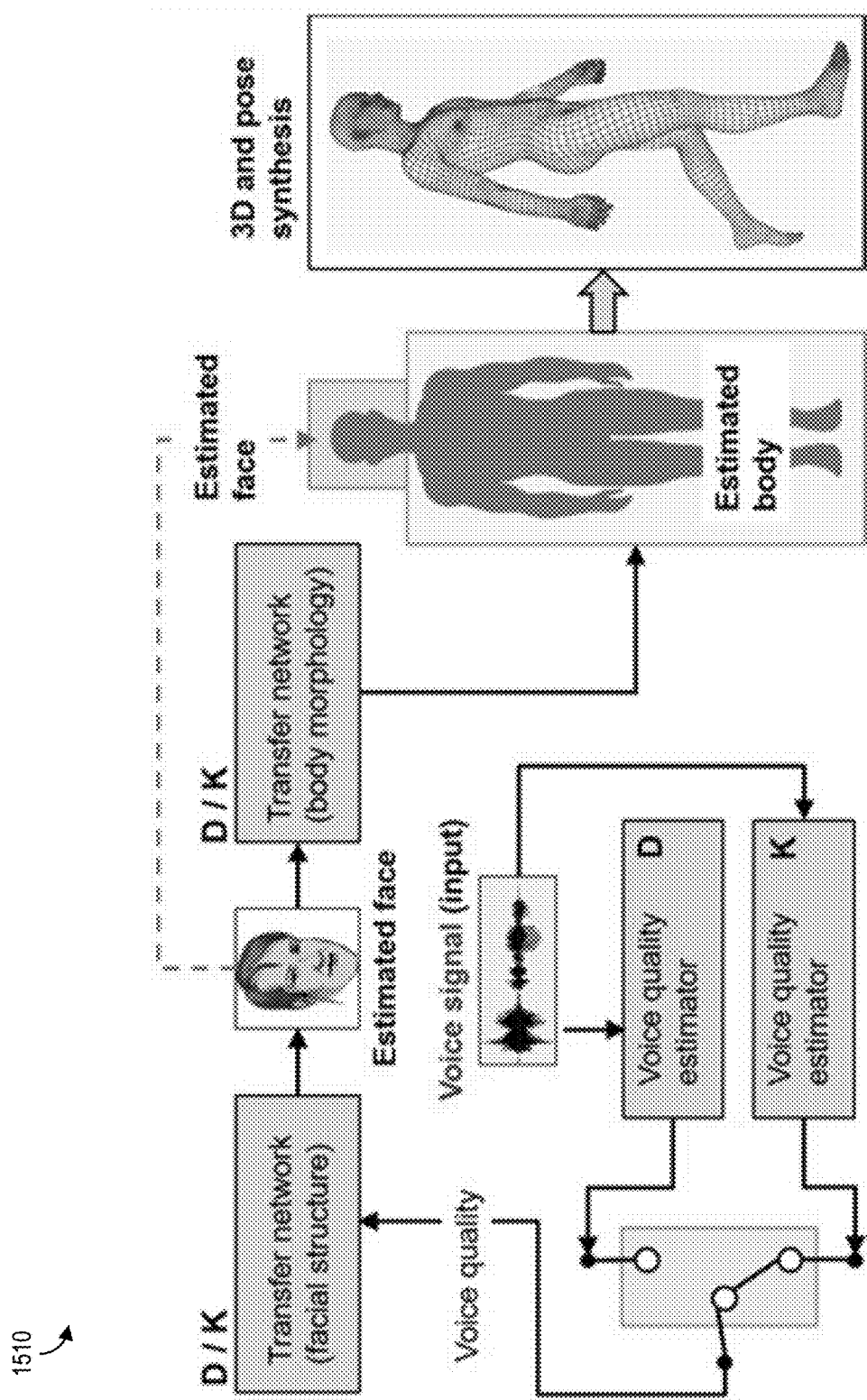
FIG. 15B shows an example process for a voice to full-body reconstruction.

The architecture of a system for full body reconstruction is shown in processes 1500 and 1510, of FIGS. 15A and 15B, respectively. Once the template body is generated, it forms the input to this system. The system is trained with a database of body images, from which target face-body image pairs are used. During training, the goal of the system is to transfer the body characteristics of the target body to the template.

The principles underlying this architecture are the same as those used in the previously described system for voice to face generation. DL, QL and RL in FIGS. 15A-15B each indicate the humanness of the generated body morphology, closeness of the generated and target bodies in terms of body characteristics (such as type, shape, measurements, ratios, indices etc. extracted by the body features extractor), and the fidelity of reconstruction respectively. A face to body characteristics generator is used to estimate the body dimensions from the facial structure.

In operational use, the process 1510 for estimating the full body structure from voice is shown in FIG. 15B. Given a voice signal, a voice to face reconstruction system is used to generate the estimated face of the speaker. Based on this (and concurrent profile information derived from the voice signal), a template for the body is estimated, and the system then generates a body with the characteristics inferred from voice.

Subsequent Processing of the Generated Body

Subsequent to full body generation, texture filling and other details may be filled in using existing knowledge-based techniques, e.g. Pose estimation can also be done, imparting the body different plausible poses based on equilibrium index and other considerations. 2D forms can be extrapolated to render 3D forms, and motion vectors may be imposed on it to create videographic renderings.

Two alternative approaches to learn to predict physical parameters from skull proportions are:

Posterior prediction: In this model, the physical structure of a speaker is represented as a composite of "basic" patterns, akin to principal component analysis. For example, the face can be represented through a set of hand-marked keypoints, or measurements shown as in FIG. 7, or proportions of such measurements etc. The measurements can be extended to the full body.

If the training data comprises standardized, well-registered 3-D images of the body, these keypoints, in fact, represent an invertible measurement from which a reasonable reconstruction of the physical structure may be obtained. The posterior prediction model learns a direct regression from features derived from the corresponding voice signals to these features.

The actual regression models must consider the fact that information is embedded both in the instantaneous and temporal progression of the voice signal. When multiple independent inputs are presented to the regressor, it is inefficient for it to be obtaining independent estimates. Instead, it is more effective for additional inputs to be used to refine the estimates obtained from previous inputs. It must effectively utilize auxiliary information, such as gender, race, etc. to improve predictions, when presented; however, the predictions need not be contingent on the availability of these inputs.

This approach treats the prediction of different body parameters as separate, but coupled predictions within a multi-task framework. The framework allows a great deal of latitude in the structure of the network, the constraints applied, the learning paradigms, etc.

Generative models: In this framework, the model learns the conditional probability distribution of the body parameter variables from training data. While it is conditioned on voice, the auxiliary measurements are treated as random variables whose distribution must also be learned. During inference, if their value is known, the distribution can be further conditioned on them; otherwise they can be marginalized out of the estimate.

The probability distributions to be learned are complex and not easily modeled through conventional means. Standard maximum-likelihood estimators are unable to capture the complexity of the model. This requires us to use variants one of two types of frameworks that enable learning complex distributions through transformation of a random variable drawn from a simpler distributions. The first variant is that of a GAN framework, wherein the parameters of the transform are optimized by an adversarial model that distinguishes between random draws from the model and actual samples of data.

For training, the former could be transformed draws of the random variable, while the latter could be instances of actual physical characterizations of speakers. The transforms are optimized to obtain accurate approximations to the true conditional distribution of physical measurements for the target speaker given his/her voice signals, such that draws from it are indistinguishable from the actual physical measurements of the speaker. Once learned, the model can be used to derive maximum a-posteriori (MAP) estimates of the physical measurements, given the speech signal. The actual nature of the transformation, which is modeled by an appropriately designed neural network, the learning algorithms and the optimal inference algorithms must be carefully designed keeping data availability and computational constraints in mind.

The second variant is that of "normalizing flows," wherein standard parametric models are converted to more complex ones through a series of invertible transformations. As in the generative-adversarial framework, the transforms themselves are modeled by neural network, however here the actual learning is performed through variational approximation. This framework is excellent for capturing conditional probability distributions of the voice signal, given conditioning measurements such as the physical measurements of the speaker, and the content of their speech. The model is easily inverted to obtain the distribution of physical measurements conditioned on the voice and additional auxiliary input. As before, the actual structure of the transformations, the learning algorithms, and inference algorithms must again be designed based on practical considerations.

Any end-to-end technology for mapping voice to a physically accurate avatar (embodiment and visage) of the speaker, and possibly elements of the environment around them as they speak, requires the development and application of a series of techniques. These include techniques for (a) micro-feature discovery guided by prior knowledge (b) disambiguating the mixed influences of multiple speaker parameters on voice (c) modeling and mapping the discovered features to judiciously chosen physical parameters in 3D space that can lead to further inferences of fuller structures, and d) the actual creation or rendering of images (holographic or otherwise) based on deduced information.

Figure 16:
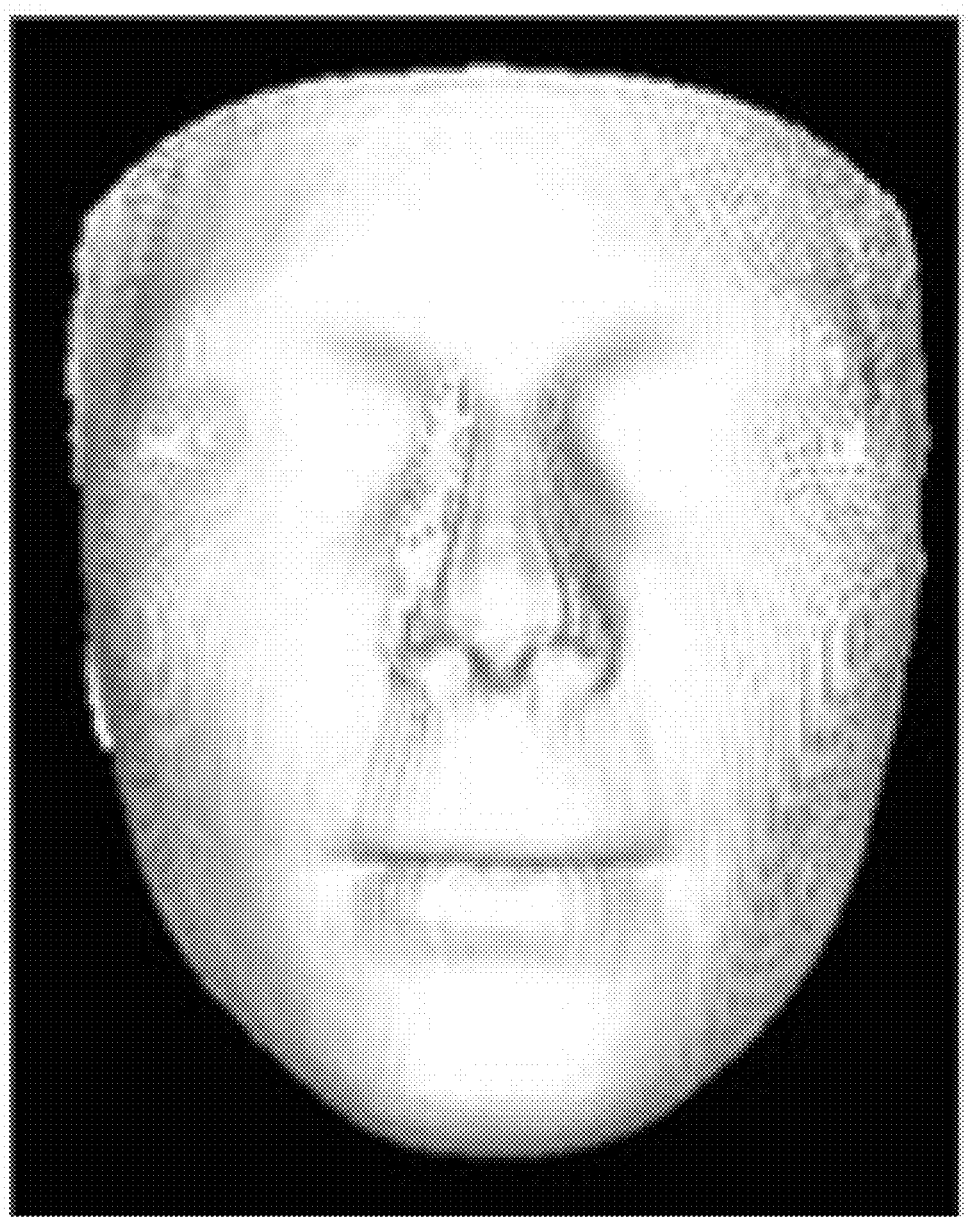
FIG. 16 shows an example of a generated representation of a speaker's face from voice.

FIG. 16 shows an output 1600 of the 3D-face reconstruction. The face was reconstructed in 3D, and was open to 720 degrees (or 4 $\pi$ steradians) solid angle rotations by the speaker in a virtual reality environment. The close-up of a face (on screen) rendered in response to a speaker's voice by the same system is shown. Rendering techniques are heavily tied to the hardware used, and both the speed and resolution of the renderings is constrained by these. Gaming systems use some of the most highly hardware-optimized algorithms for these currently.

Figure 17:
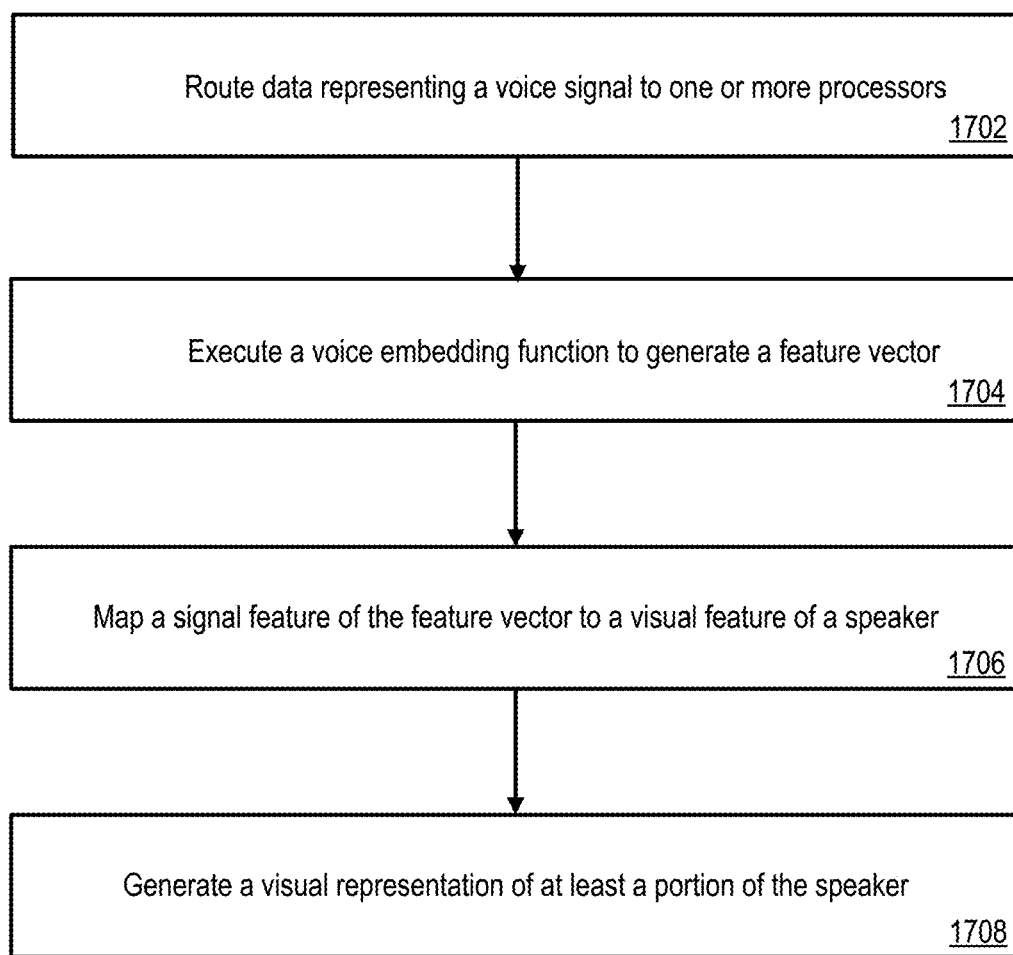
FIG. 17 shows a flow diagram including an example processes for generating a representation of a face from a voice signal.

Turning to FIG. 17, an example process 1700 is shown for processing speech signals of a user to generate a visual representation of the user. The computing system is configured to route (1702) data representing a voice signal to one or more processors that generate a response to the voice signal. The computing system is configured to generate a representation of a speaker that generated the voice signal in response to receiving the voice signal by executing (1704) a voice embedding function to generate a feature vector from the voice signal representing one or more signal features of the voice signal. The computing system maps (1706) a signal feature of the feature vector to a visual feature of the speaker by a modality transfer function specifying a relationship between the visual feature of the speaker and the signal feature of the feature vector. The computing system generates (1708) a visual representation of at least a portion of the speaker based on the mapping, the visual representation comprising the visual feature.

Figure 18:
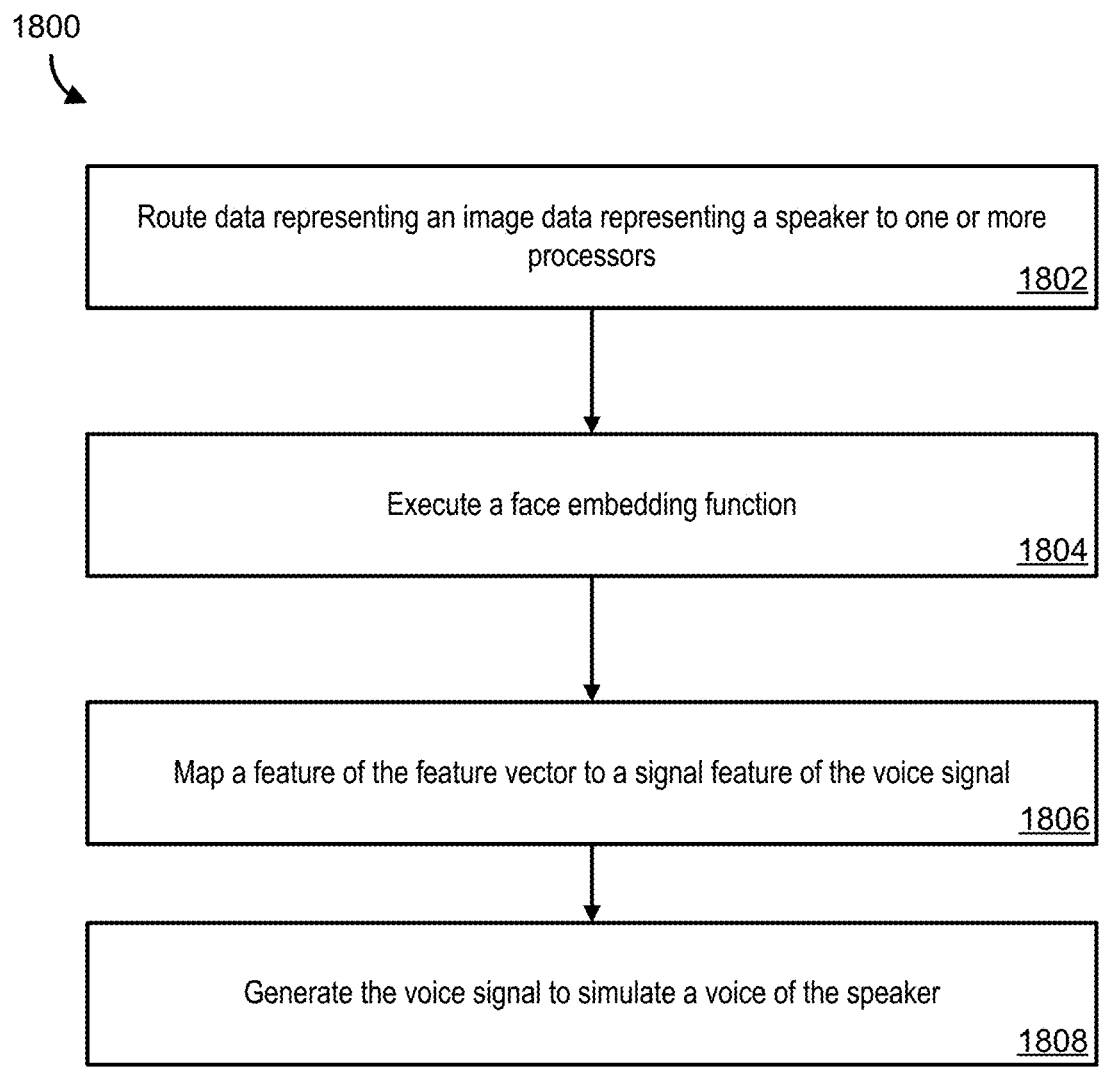
FIG. 18 shows a flow diagram including an example process for processing image data to generate a simulated voice signal representing a speaker's voice

Turning to FIG. 18, an example process 1800 is shown for processing image data to generate a simulated voice signal representing a speaker's voice. A computing system routes (1802) data representing an image data representing a speaker to one or more processors that generate a response to the image data. The computing system generates a simulation of a voice signal in response to receiving the image data by executing (1804) a face embedding function to generate a feature vector from the image data representing visual features of the image data. The computing system maps (1806) mapping a feature of the feature vector to a signal feature of the voice signal by a modality transfer function specifying a relationship between the visual features of the image data and the signal feature of the voice signal. The computing system generates (1808), based on the mapping, the voice signal to simulate a voice of the speaker, the voice signal comprising the signal feature.

Some implementations described in this specification (e.g., the query response module 104, the data structure module 106, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, data processing device 120 and the detection device 110 each include a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 19:
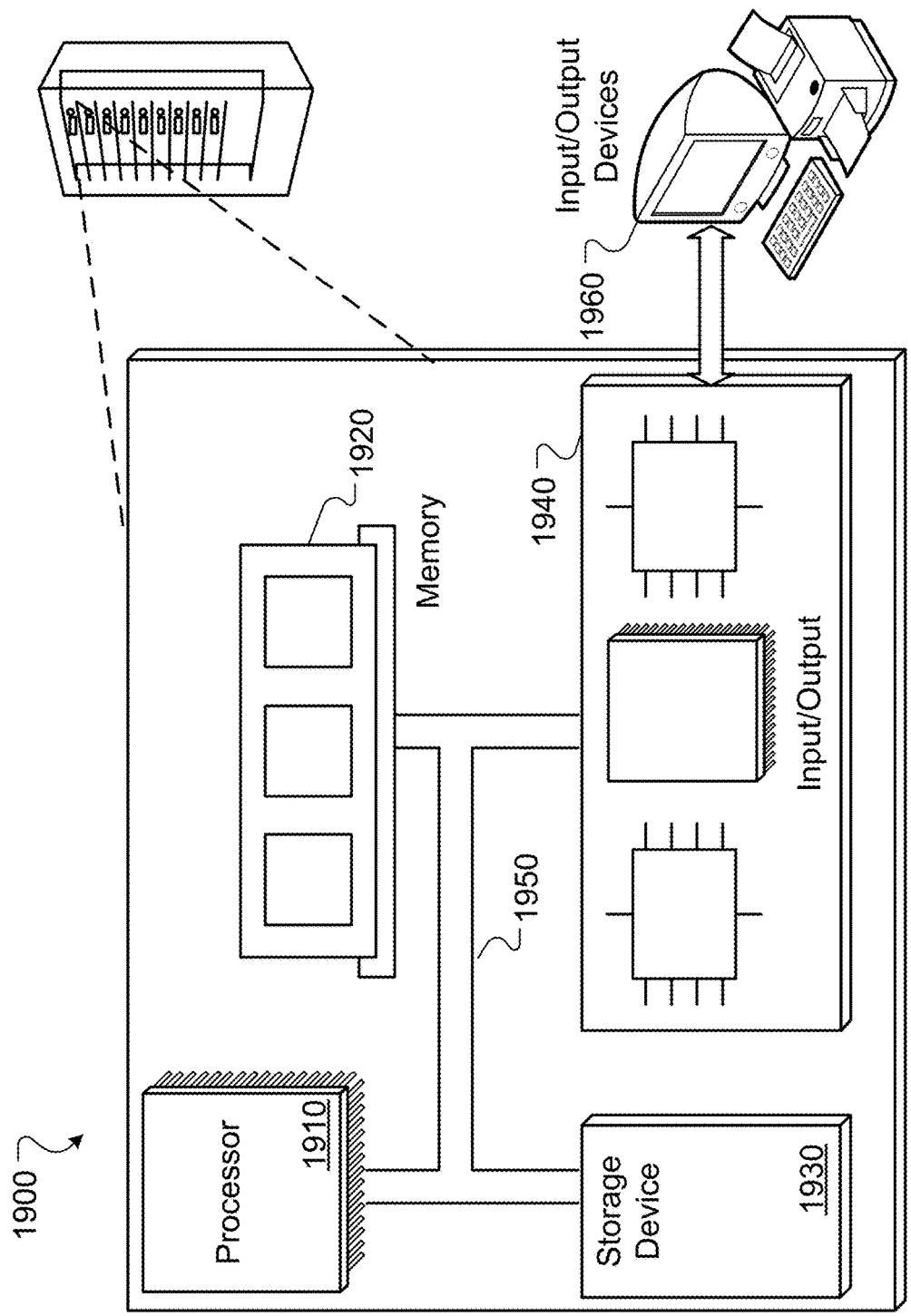
FIG. 19 is a diagram of an example computing system.

FIG. 19 shows an example computer system 1900 that includes a processor 1910, a memory 1920, a storage device 1930 and an input/output device 1940. Each of the components 1910, 720, 1930 and 1940 can be interconnected, for example, by a system bus 1950. The processor 1910 is capable of processing instructions for execution within the system 1900. In some implementations, the processor 1910 is a single-threaded processor, a multi-threaded processor, or another type of processor. The processor 1910 is capable of processing instructions stored in the memory 1920 or on the storage device 1930. The memory 1920 and the storage device 1930 can store information within the system 1900.

The input/output device 1940 provides input/output operations for the system 1900. In some implementations, the input/output device 1940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A computing system for generating image data representing a speaker's face, the computing system comprising:
    a detection device configured to route data representing a voice signal to one or more processors that generate a response to the voice signal; and
    a data processing device comprising the one or more processors, the data processing device configured to generate a representation of a speaker that generated the voice signal in response to receiving the voice signal by performing operations comprising:
        executing a voice embedding function to generate a feature vector from the voice signal representing one or more signal features of the voice signal;
        mapping a signal feature of the feature vector to a visual feature representing at least a portion of a physical appearance of a given speaker, the mapping based on a modality transfer function specifying a relationship between the visual feature included in the physical appearance of the given speaker and the signal feature of the feature vector;
        reconstructing, based on the visual feature that is mapped to the signal feature in the feature vector, a rendered representation of the speaker that approximates a real physical appearance of the speaker by including the visual feature;
        wherein the reconstructing is performed independent of an image representing the physical appearance of the speaker being provided to the data processing device; and
        generating, independent of the image representing the physical appearance of the speaker being provided to the data processing device, a visual representation of at least a portion of the speaker based on the rendered representation of the speaker.

2. The computing system of claim 1, wherein parameters of the voice embedding function that specify which of the one or more signal features of the voice signal are included in the feature vector are trained with one or more covariate classifiers that receive image data and voice signals.

3. The computing system of claim 1, further comprising generating an inference of a value for the visual feature based on a known correlation of the one or more signal features of the voice signal to the visual feature of the speaker.

4. The computing system of claim 3, where value for the visual feature comprises a size or relative proportions of articulators and vocal chambers of the speaker.

5. The computing system of claim 1, wherein the visual representation comprises a reconstructed representation of a face of the speaker.

6. The computing system of claim 1, wherein at least one of the one or more signal features of the feature vector comprises a voice quality feature, wherein the voice quality feature is related deterministically to measurements of a vocal tract of the speaker, wherein the measurements of the vocal tract are related to measurements of a face of the speaker, and wherein the data processing device is configured to recreate a geometry and of the face of the speaker based on determining the voice quality feature.

7. The computing system of claim 1, the operations further comprising receiving, from the detection device, data comprising a template face, and modifying the data comprising the template face to incorporate the visual feature.

8. The computing system of claim 1, where the visual feature comprises one or more of a skull structure, a gender of the speaker, an ethnicity of the speaker, a facial landmark of the speaker, or a nose structure of the speaker.

9. The computing system of claim 1, wherein the operations further comprise:
generating a facial image of the speaker in two or three dimensions independent of receiving data comprising a template image.

10. The computing system of claim 1, where the voice embedding function comprises a regression function configured to enable the data processing device to generate a statistically plausible face that incorporates the visual feature.

11. The computing system of claim 1, where the voice embedding function comprises a generative model configured to enable the data processing device to generate a statistically plausible face that incorporates the visual feature.

12. The computing system of claim 1, wherein the data processing device is configured to receive auxiliary data about the speaker comprising an age, a height, a gender, an ethnicity, or a body-mass index (BMI) value.

13. The computing system of claim 12, wherein the data processing device is configured to estimate one or more body indices of the speaker based on the auxiliary data, wherein the visual representation of the speaker comprises a full-body representation based on the one or more body indices.

14. The computing system of claim 13, where the body indices are represented by a vector that includes a number of linear and volumetric characterizations of a body of the speaker.

15. The computing system of claim 13, wherein a relation between visual features and the body indices is modelled by a neural network that is trained from training data comprising at least one of image data representing faces of speakers and voice signals.

16. A computing system for generating a voice signal, the computing system comprising:
a detection device configured to route data comprising an image of a speaker to one or more processors that generate a response to the image data; and
a data processing device comprising the one or more processors, the data processing device configured to, in response to receiving the image of the speaker, generate a simulation of a voice signal that approximates a real voice of the speaker comprising a vocal resonance value, a vocal anti-resonance value, a pitch value, or a glottal waveform, the generating being based on performing operations comprising:
executing a face embedding function to generate a feature vector from the image data representing geometric facial features of the speaker represented in the image, the facial features comprising a portion of a facial geometry;
mapping the portion of the facial geometry of the feature vector to a signal feature of the voice signal by a modality transfer function specifying a relationship between the geometric facial features of the image and the signal feature of the voice signal, the signal feature comprising at least one of a vocal resonance value, a vocal anti-resonance value, a pitch, or an estimated glottal flow waveform; and
generating, based on the mapping, the voice signal to simulate the voice that approximates the real voice of the speaker in the image, the voice signal comprising the signal feature corresponding to the vocal resonance value, the vocal anti-resonance value, the pitch value, or the glottal flow waveform.

17. The computing system of claim 16, wherein mapping comprises:
determining, by voice quality generation logic, a voice quality of the voice signal comprising one or more spectral features; and
determining, by content generator logic, a style of the voice signal, a language of the voice signal, or an accent for the voice signal that includes the one or more spectral features.

18. The computing system of claim 17, where the voice quality generator logic is configured to map visual features derived from facial images to estimates of one or more subcomponents of voice quality.

19. The computing system of claim 17, wherein the voice quality generation logic determines the voice quality based on training data comprising facial image-voice quality pairs.

20. The computing system of claim 17, wherein the voice quality generation logic determines the voice quality based on a known relationship between visual features, the known relationship being derived from a plurality of images and voice qualities data.

* * * * *